(12) United States Patent
Kim

(10) Patent No.: US 12,451,139 B2
(45) Date of Patent: Oct. 21, 2025

(54) DEVICE FOR PROCESSING VOICE AND OPERATION METHOD THEREOF

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 333 days.

(21) Appl. No.: 18/015,472

(22) PCT Filed: Jul. 9, 2021

(86) PCT No.: PCT/KR2021/008826
§ 371 (c)(1),
(2) Date: Jan. 10, 2023

(87) PCT Pub. No.: WO2022/010320
PCT Pub. Date: Jan. 13, 2022

(65) Prior Publication Data
US 2023/0290355 A1    Sep. 14, 2023

(30) Foreign Application Priority Data

Jul. 10, 2020  (KR) .......... 10-2020-0085369
Oct. 28, 2020  (KR) .......... 10-2020-0141311
(Continued)

(51) Int. Cl.
*G10L 17/06*   (2013.01)
*G10L 15/00*   (2013.01)
*G10L 25/78*   (2013.01)

(52) U.S. Cl.
CPC ............ *G10L 17/06* (2013.01); *G10L 15/005* (2013.01); *G10L 25/78* (2013.01)

(58) Field of Classification Search
CPC ....... G10L 17/06; G10L 15/005; G10L 15/00; G10L 25/78; G10L 2021/02087;
(Continued)

(56) References Cited

U.S. PATENT DOCUMENTS 9,749,738 B1 *  8/2017  Adsumilli ............. H04R 3/005
10,091,599 B2   10/2018  Lee et al.
(Continued)

FOREIGN PATENT DOCUMENTS

JP           4964204 B2     6/2012
JP       2013-106298 A      5/2013
(Continued)

OTHER PUBLICATIONS

JP Office Action dated Feb. 6, 2024 as received in Application No. 2023-501279.

*Primary Examiner* — Huyen X Vo
(74) *Attorney, Agent, or Firm* — Maschoff Brennan

(57) ABSTRACT

Disclosed is a voice processing device. The voice processing device comprises a memory and a processor configured to perform sound source isolation on voice signals associated with the voices of speakers on the basis of the sound source positions of the respective voices. The processor is configured to: generate sound source position information indicating the sound source positions of the respective voices using the voice signals associated with the voices; generate isolated voice signals associated with the voices of the respective speakers from the voice signals on the basis of the sound source position information; and match the isolated voice signals and the voice source position information and store the same in the memory.

14 Claims, 14 Drawing Sheets

(30) Foreign Application Priority Data

Nov. 2, 2020 (KR) .......................... 10-2020-0144524
Nov. 2, 2020 (KR) .......................... 10-2020-0144534

(58) Field of Classification Search
CPC . G10L 21/0208; G10L 21/0272; Y02B 20/40;
H04N 7/15; H04R 25/405; H04R 1/40;
H04R 3/00; G01S 3/808; G06F 40/47;
H05B 47/12
See application file for complete search history.

(56) References Cited

U.S. PATENT DOCUMENTS

| | | | |
|---|---|---|---|
| 2016/0203828 A1* | 7/2016 | Gomez | ................... G10L 15/20 |
| | | | 704/226 |
| 2019/0130931 A1* | 5/2019 | Costa | ..................... G10L 21/10 |
| 2020/0217919 A1 | 7/2020 | Eronen et al. | |

FOREIGN PATENT DOCUMENTS

| | | | |
|---|---|---|---|
| JP | 5339501 B2 | 11/2013 |
| JP | 5724125 B2 | 5/2015 |
| KR | 10-1889809 B1 | 8/2018 |
| KR | 10-1983310 B1 | 5/2019 |
| KR | 10-2127640 B1 | 6/2020 |

* cited by examiner

[Fig. 1]
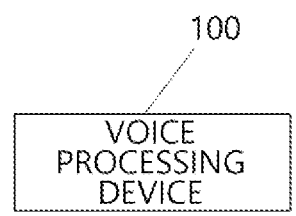
[Fig. 2]
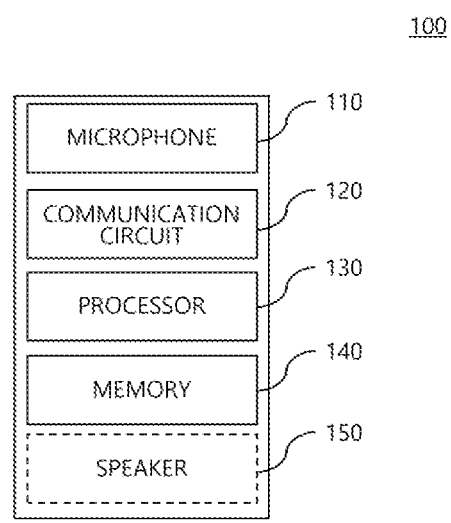

[Fig. 3]
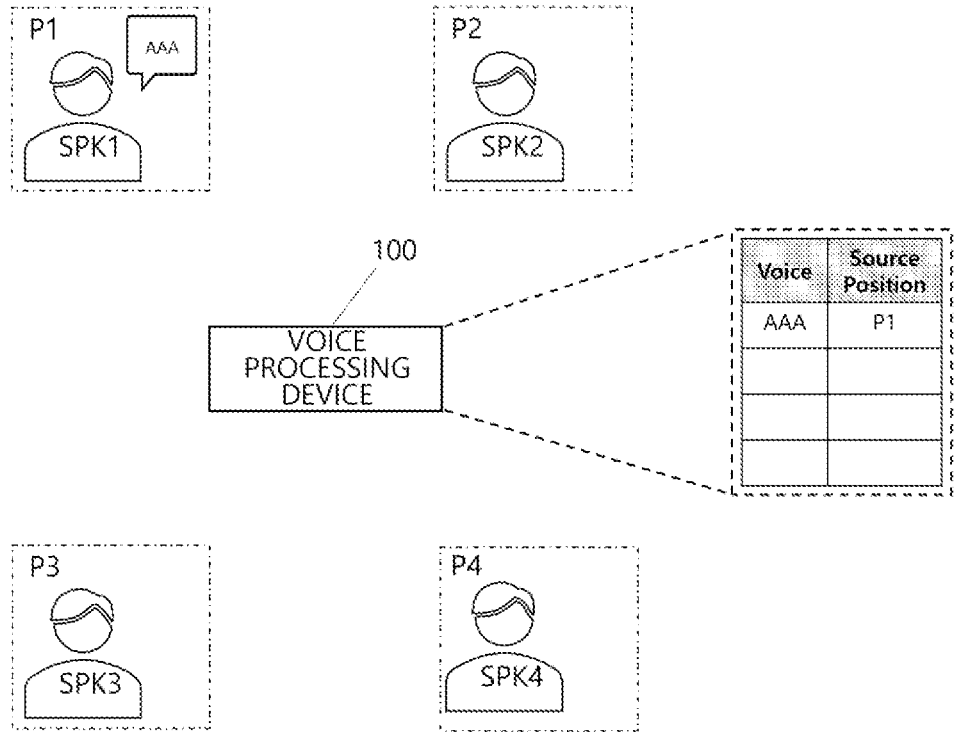
[Fig. 4]
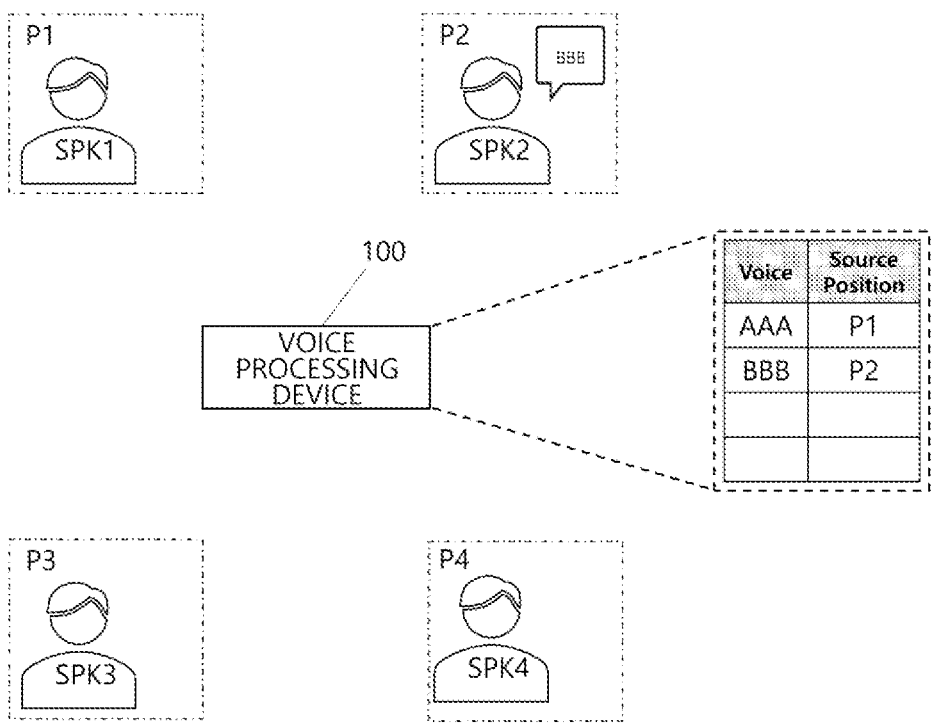

[Fig. 5]
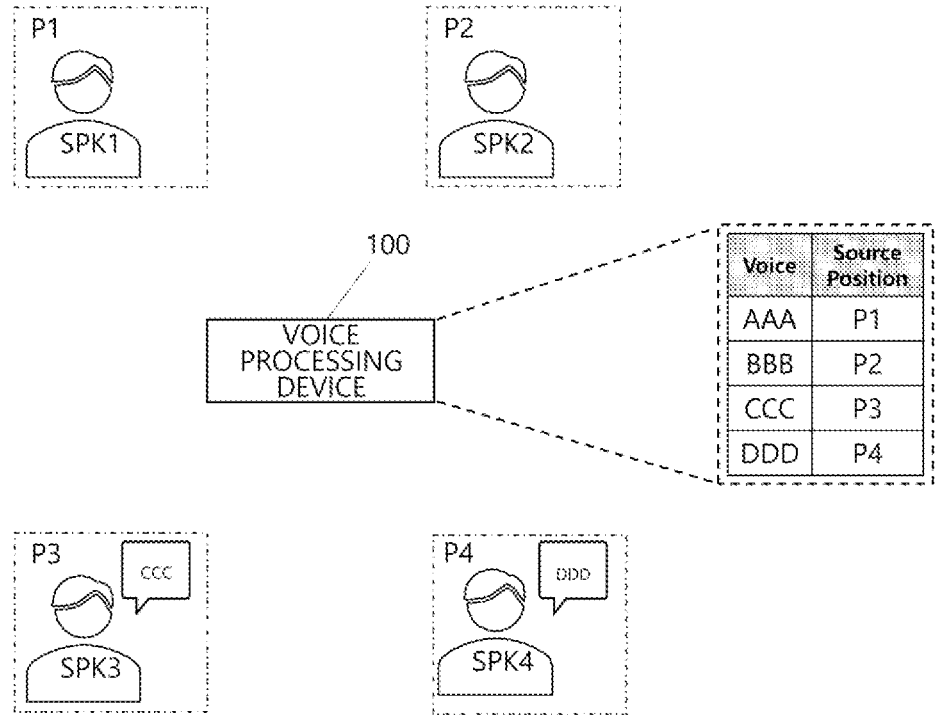
[Fig. 6]
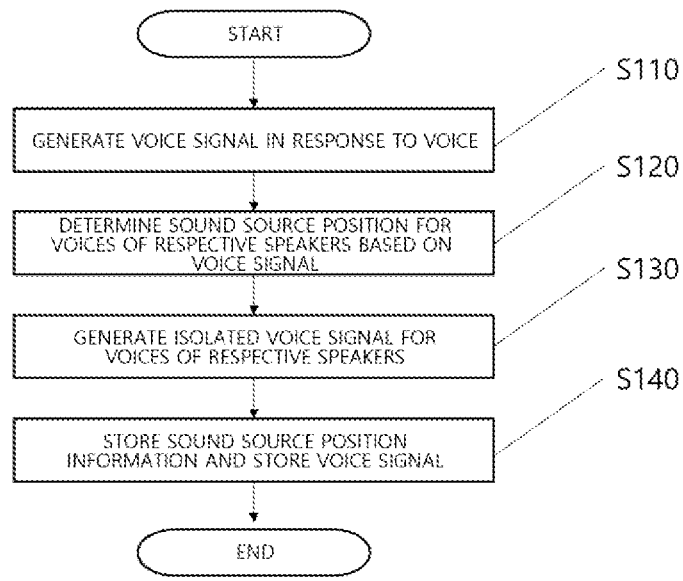

[Fig. 7]
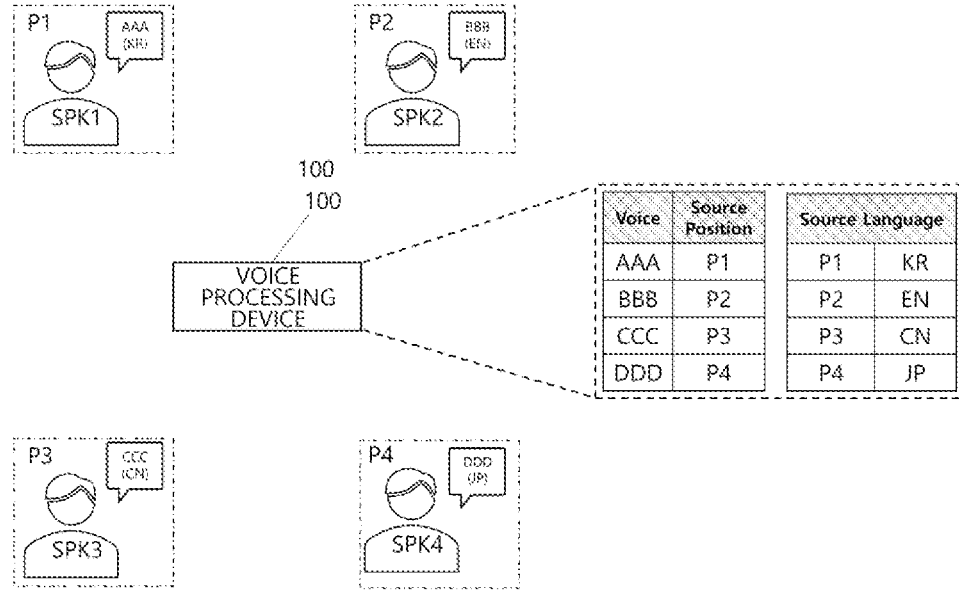
[Fig. 8]
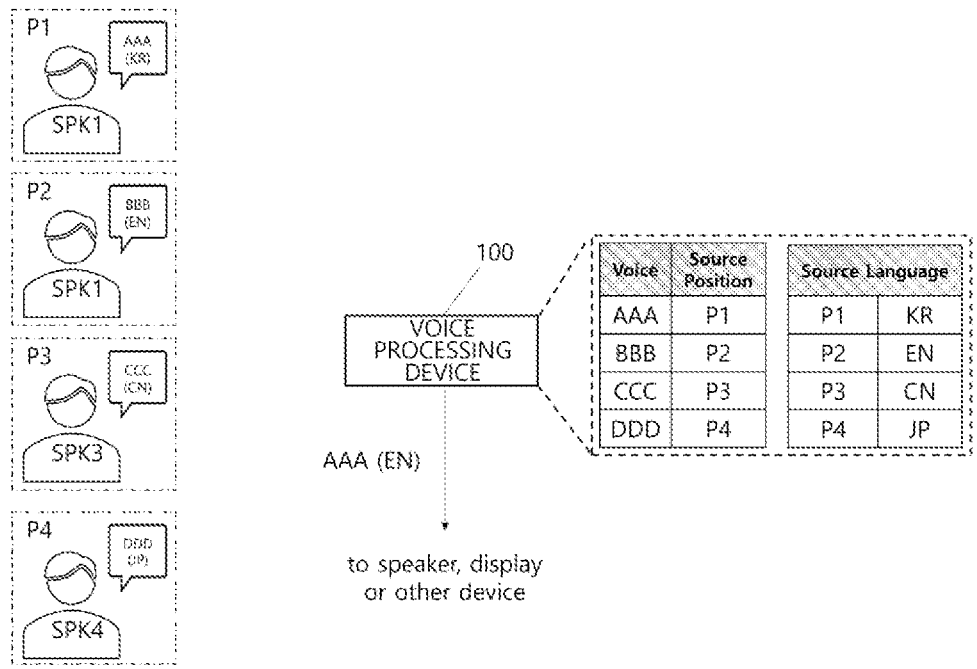

[Fig. 9]
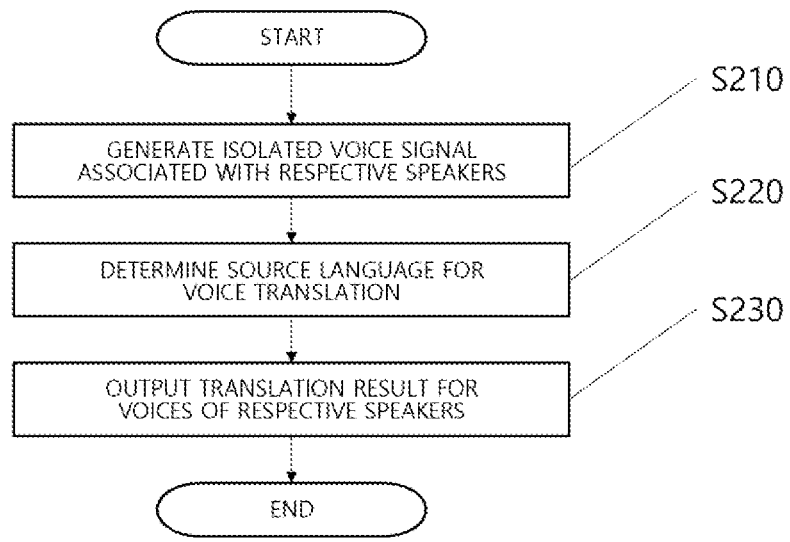
[Fig. 10]
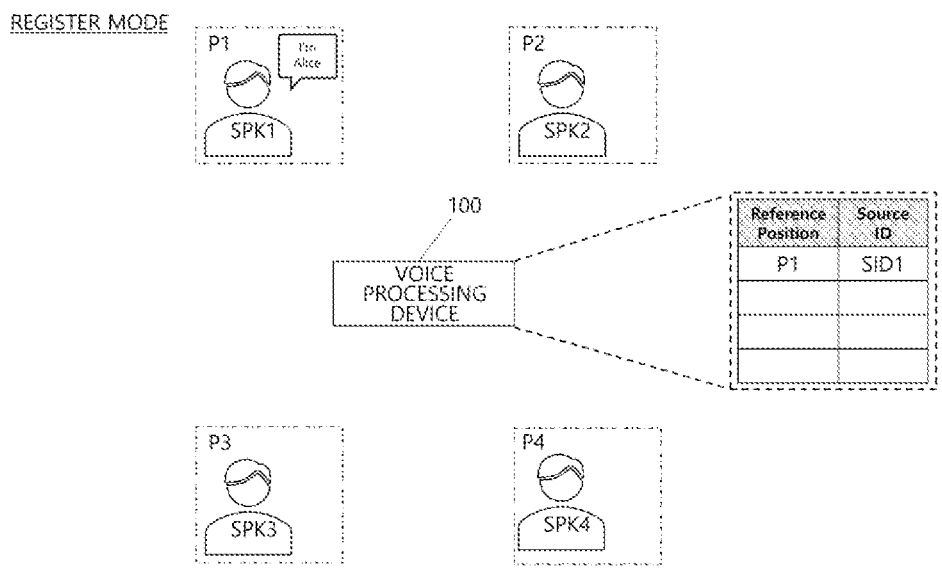

[Fig. 11]
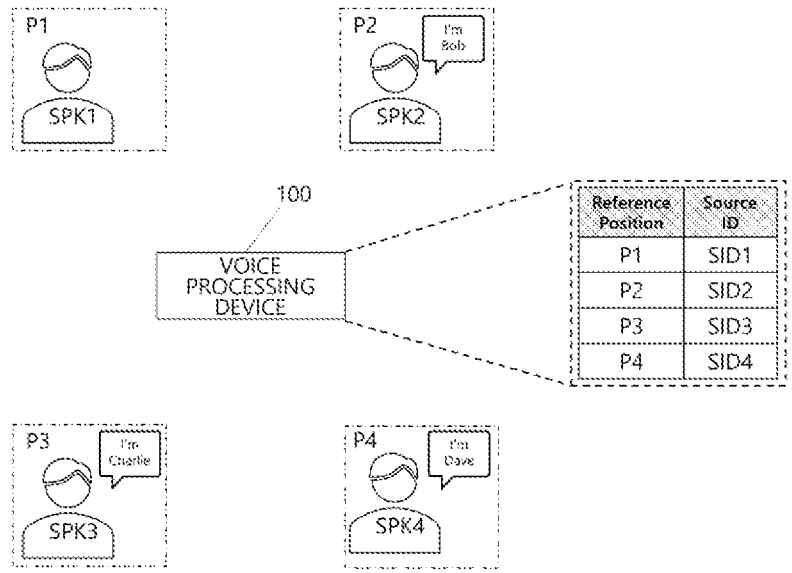
[Fig. 12]
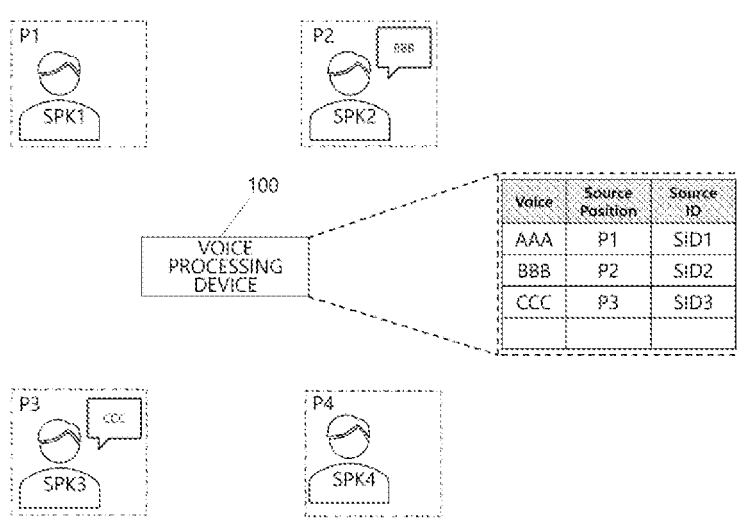

[Fig. 13]
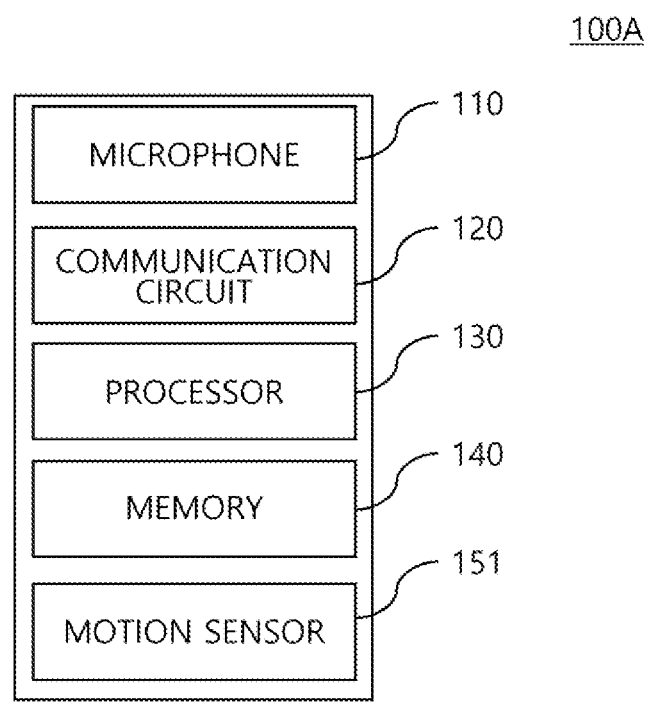
[Fig. 14]
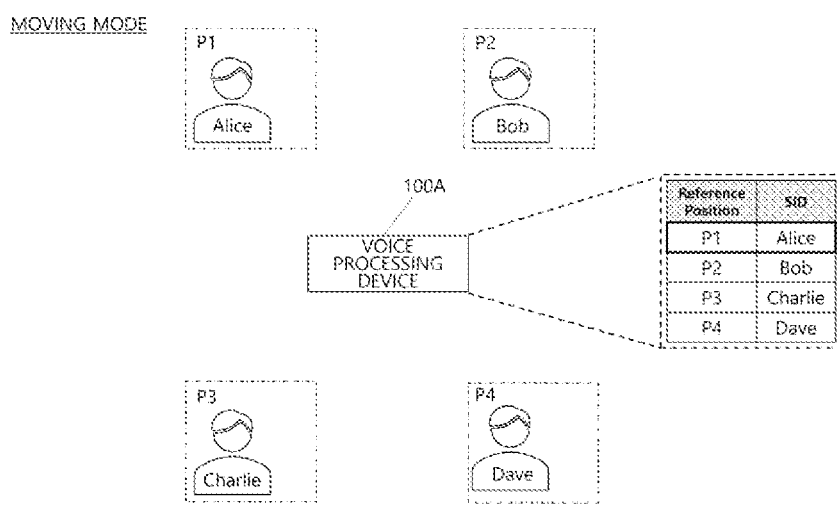

【Fig. 15】
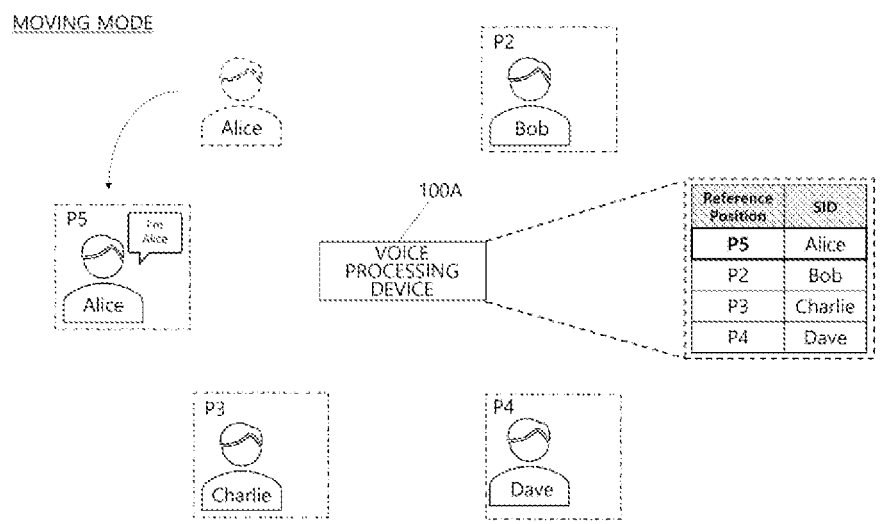
【Fig. 16】
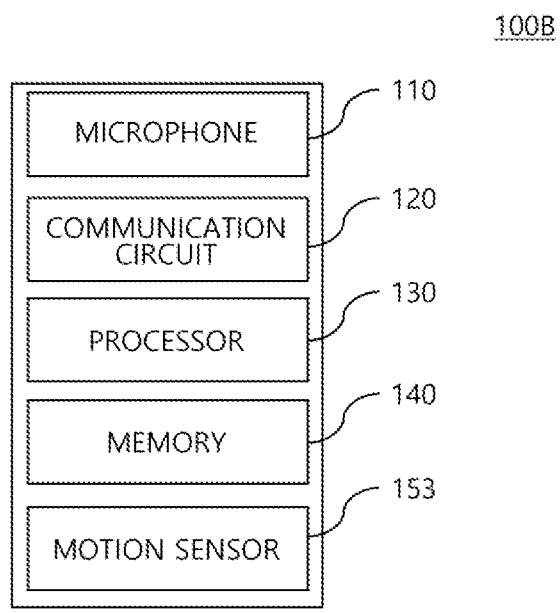

[Fig. 17]
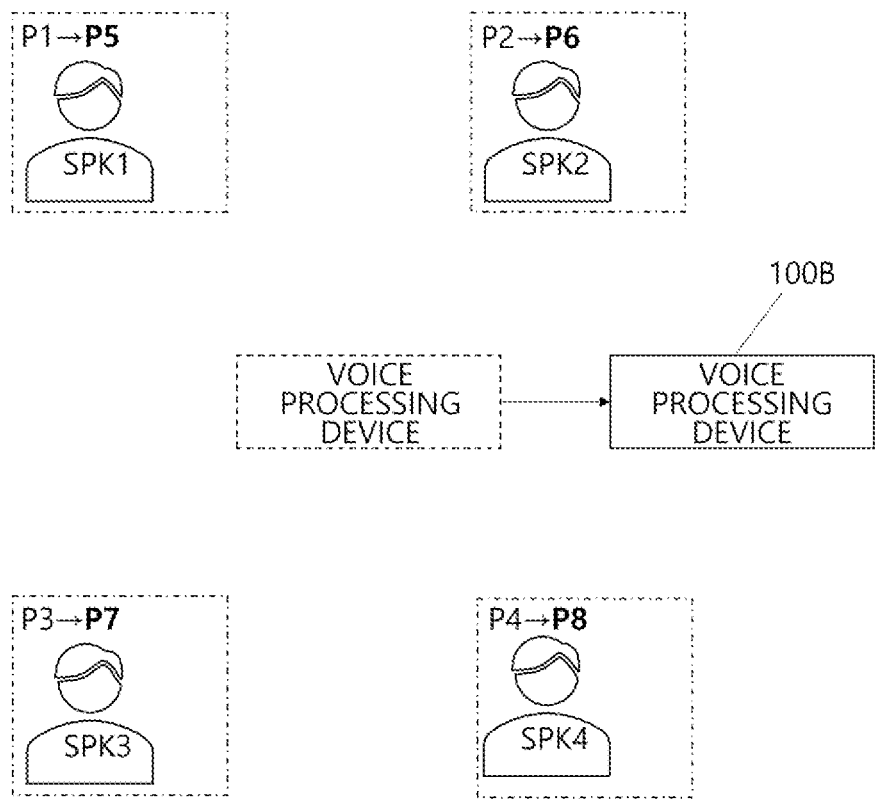
[Fig. 18]
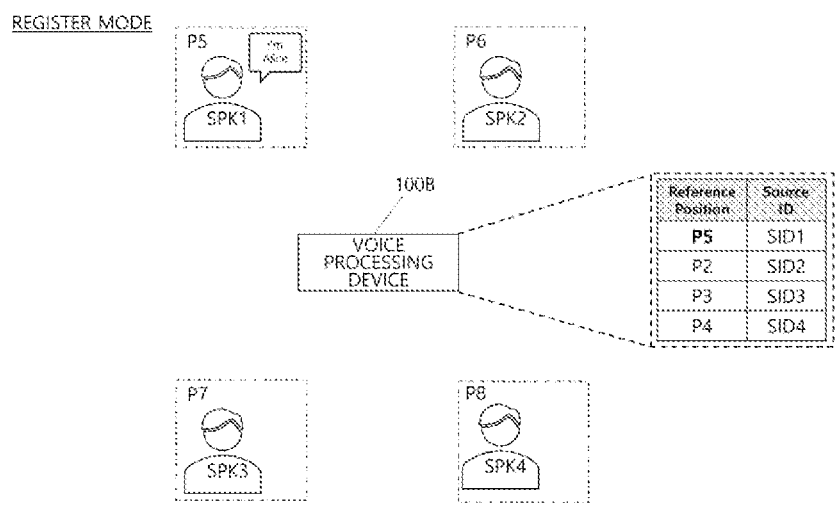

[Fig. 19]
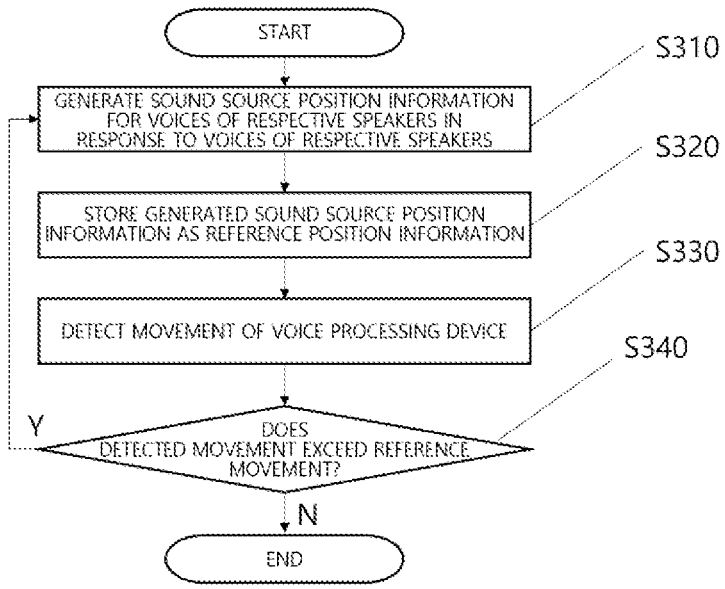
[Fig. 20]
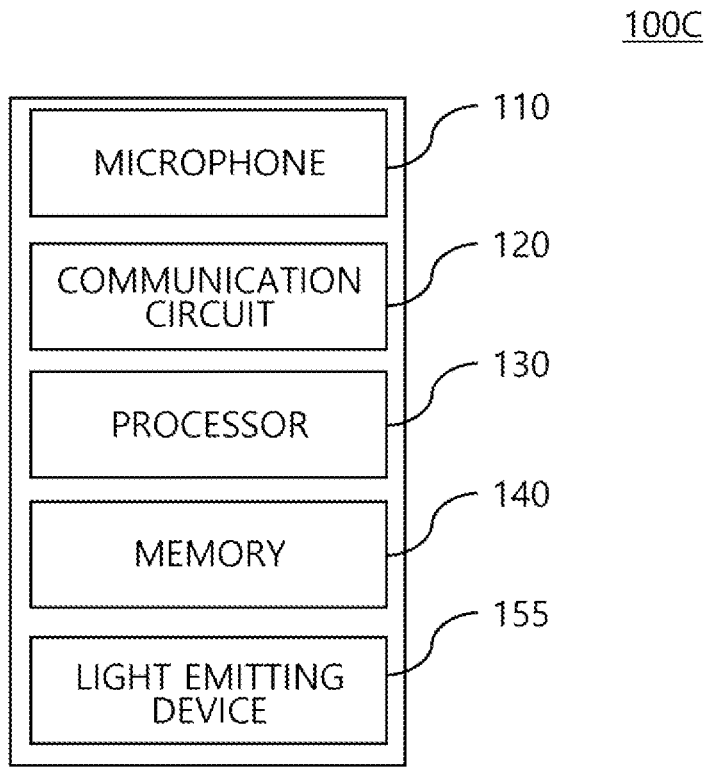

【Fig. 21】
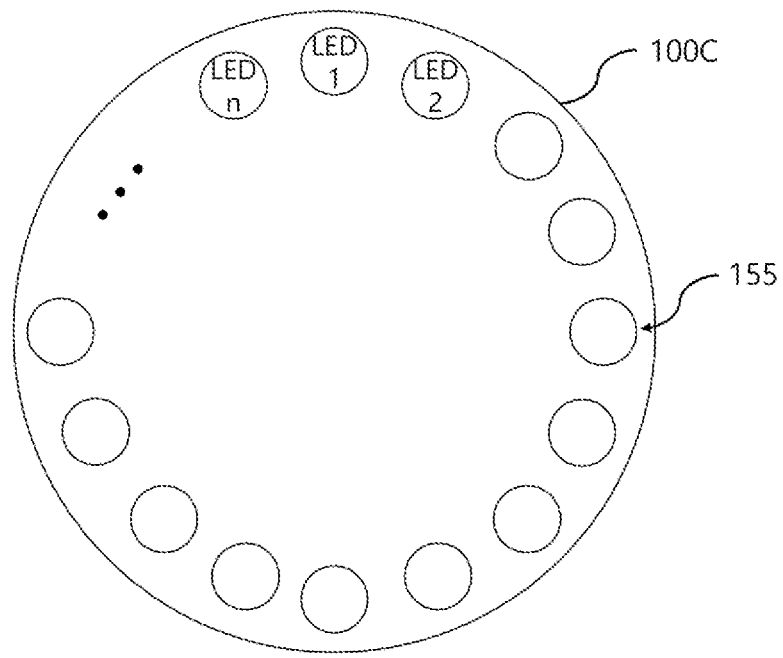
【Fig. 22】
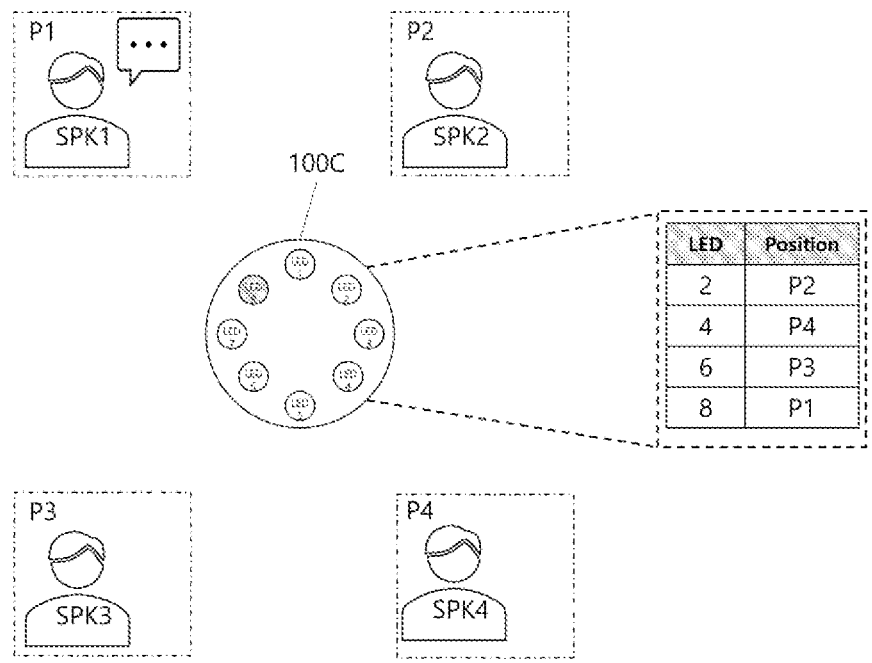

[Fig. 23]
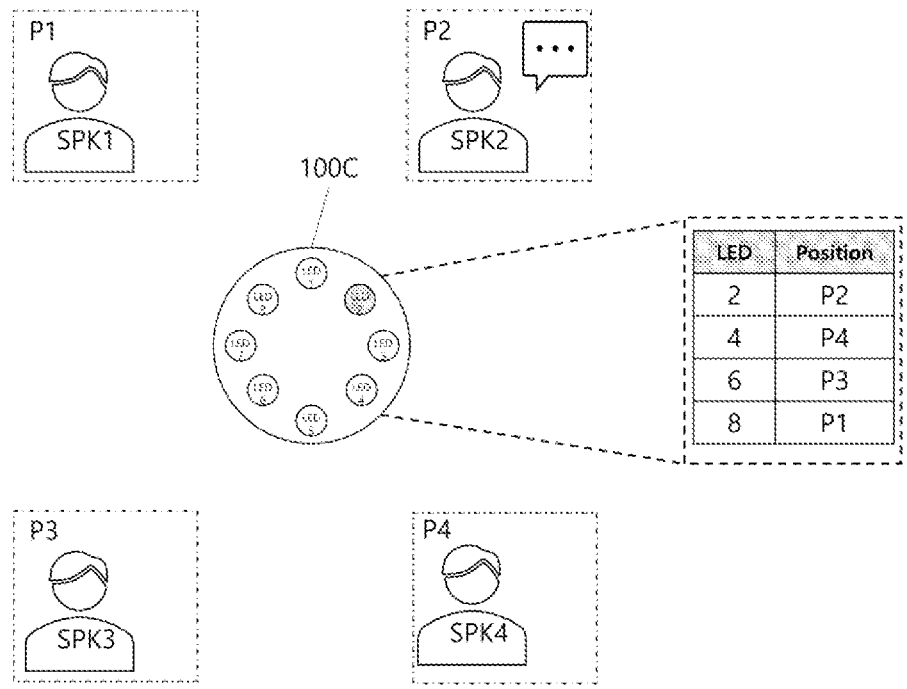
[Fig. 24]
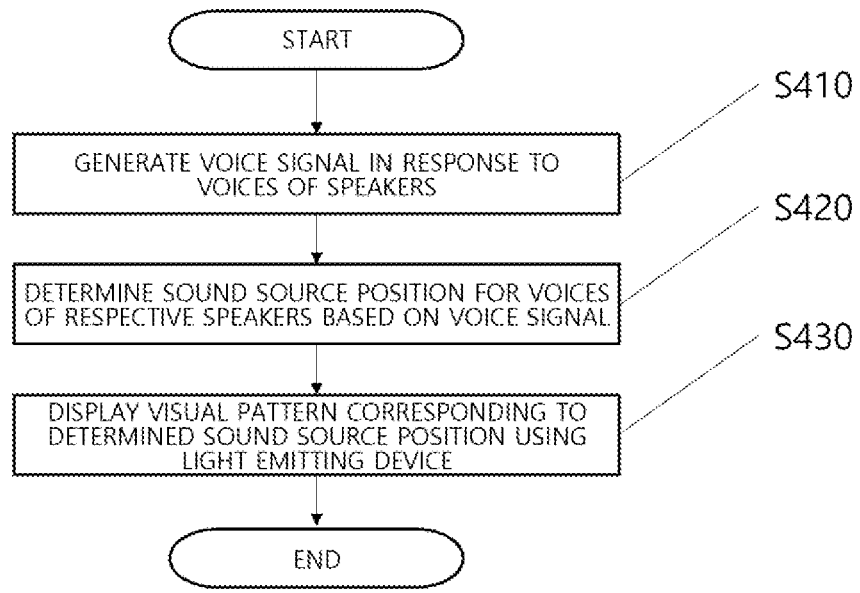

[Fig. 25]
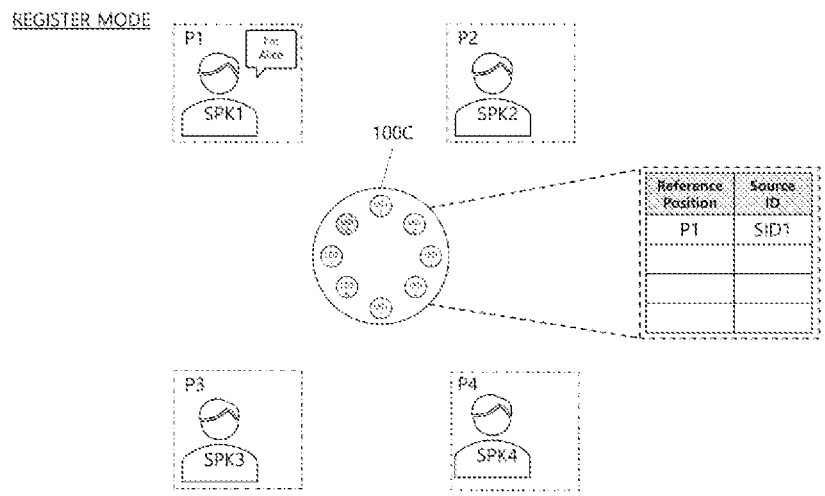
[Fig. 26]
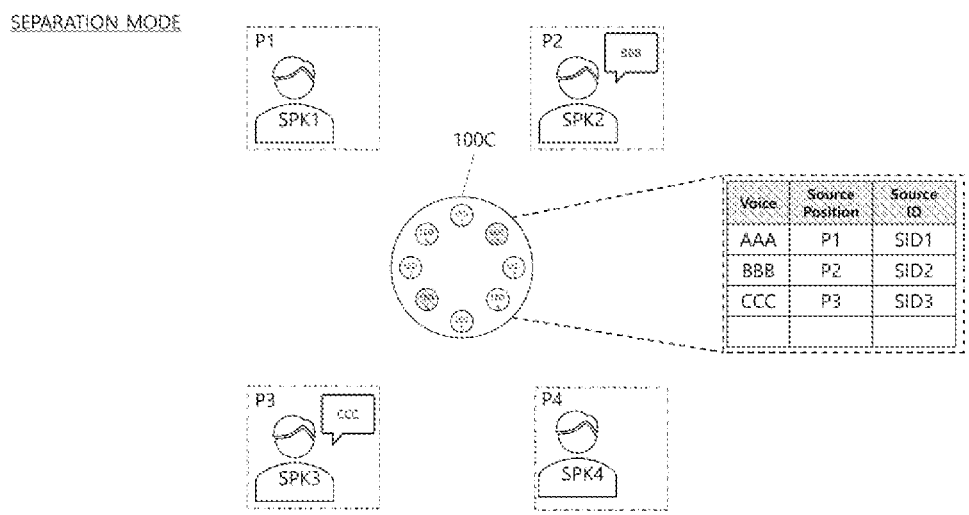

[Fig. 27]
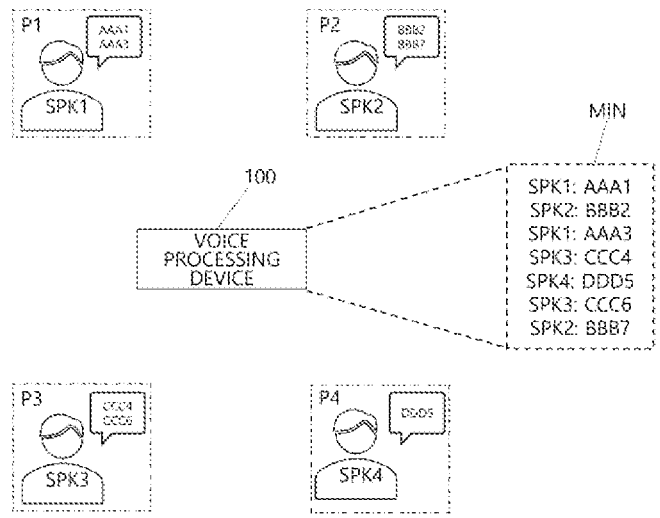

DEVICE FOR PROCESSING VOICE AND OPERATION METHOD THEREOF

TECHNICAL FIELD

Embodiments of the present disclosure relate to a device for processing voice and an operating method thereof.

BACKGROUND ART

A microphone is a device that converts voice into a voice signal which is an electrical signal. When a microphone is disposed in a space where a plurality of speakers are located, such as a conference room or a classroom, the microphone receives all voices from the plurality of speakers and generates voice signals associated with the voices of the plurality of speakers.

Meanwhile, when the plurality of speakers pronounce at the same time, the voices of the plurality of speakers may all be mixed. In this case, it is necessary to isolate a voice signal indicating voice of a specific speaker from the voices of the plurality of speakers.

DISCLOSURE

Technical Problem

An object of the present disclosure is to provide a device and an operation method thereof capable of determining positions of speakers using a plurality of input voice signals and separating and recognizing the plurality of voice signals for each speaker.

Another object of the present disclosure is to provide a device and an operation method thereof capable of generating isolated voice signals associated with voices of respective speakers in response to the voices of the speakers.

Still another object of the present disclosure is to provide a device and an operation method capable of generating a translation result for voices of respective speakers using isolated voice signals associated with voices of respective speakers and outputting the generated translation result.

Technical Solution

According to a characteristic of the present disclosure for achieving the object, the present disclosure includes a voice processing device including a memory and a processor configured to perform sound source isolation on voice signals associated with the voices of speakers on the basis of the sound source positions of the respective voices. The processor is configured to: generate sound source position information indicating the sound source positions of the respective voices using the voice signals associated with the voices; generate isolated voice signals associated with the voices of the respective speakers from the voice signals on the basis of the sound source position information; and match the isolated voice signals and the voice source position information and store the matched isolated voice signal and voice source position information in the memory.

Advantageous Effects

According to a device according to embodiments of the present disclosure, it is possible to determine a position of a speaker using a voice signal, and distinguish which speaker's voice the voice signal corresponds to through the position of the speaker. Accordingly, even if a plurality of speakers pronounce voices at the same time, a voice isolation device has an effect of distinguishing and isolating voices for each speaker.

Since the voice processing device according to the embodiments of the present disclosure may generate an isolated voice signal associated with a voice from a specific sound source position based on a sound source position of a voice, it is possible to generate a voice signal with minimized influence of ambient noise.

The voice processing device according to the embodiments of the present disclosure may not only extract voices of each speaker from a transmitted voice signal, but also determines a source language, which is a language before translation of the voices, based on the sound source positions of the voices, and provide a translation result by translating the corresponding voice based on the determined source language.

DESCRIPTION OF DRAWINGS

FIG. 1 is a diagram illustrating a voice processing environment according to embodiments of the present disclosure.

FIG. 2 is a diagram illustrating a voice processing device according to embodiments of the present disclosure.

FIGS. 3 to 5 are diagrams for describing an operation of a voice processing device according to embodiments of the present disclosure.

FIG. 6 is a flowchart illustrating a voice isolation method by a voice processing device according to embodiments of the present disclosure.

FIG. 7 is a diagram for describing a translation function of a voice processing device according to embodiments of the present disclosure.

FIG. 8 is a diagram for describing a translation function of a voice processing device according to embodiments of the present disclosure.

FIG. 9 is a flowchart illustrating a method of providing a translation result by the voice processing device according to the embodiments of the present disclosure.

FIGS. 10 and 11 are diagrams for describing an operation of a voice processing device according to embodiments of the present disclosure.

FIG. 12 is a diagram illustrating the operation of the voice processing device according to the embodiments of the present disclosure.

FIG. 13 is a diagram illustrating the voice processing device according to the embodiments of the present disclosure.

FIGS. 14 and 15 are diagrams for describing a speaker moving mode according to the embodiments of the present disclosure.

FIG. 16 is a diagram illustrating the voice processing device according to the embodiments of the present disclosure.

FIGS. 17 and 18 are diagrams for describing an operation of the voice processing device according to the embodiments of the present disclosure.

FIG. 19 is a diagram illustrating a method of operating a voice processing device according to embodiments of the present disclosure.

FIG. 20 is a diagram illustrating the voice processing device according to the embodiments of the present disclosure.

FIG. 21 is a diagram illustrating the voice processing device according to the embodiments of the present disclosure.

FIGS. 22 and 23 are diagrams for describing an operation of a voice processing device according to embodiments of the present disclosure.

FIG. 24 is a flowchart illustrating a method of operating a voice processing device according to embodiments of the present disclosure.

FIG. 25 is a diagram for describing the operation of the voice processing device according to the embodiments of the present disclosure.

FIG. 26 is a diagram illustrating the operation of the voice processing device according to the embodiments of the present disclosure.

FIG. 27 is a diagram for describing the operation of the voice processing device according to the embodiments of the present disclosure.

MODE(S) FOR CARRYING OUT THE INVENTION

Hereinafter, embodiments of the present disclosure will be described with reference to the accompanying drawings.

FIG. 1 is a diagram illustrating a voice processing environment according to embodiments of the present disclosure. Referring to FIG. 1, speakers SPK1 to SPK4 may be positioned in a space (e.g., a conference room, a vehicle, a lecture room, etc.) to pronounce a voice. According to embodiments, the first speaker SPK1 may pronounce voice at a first position P1, the second speaker SPK2 may pronounce voice at a second position P2, the third speaker SPK3 may pronounce voice at a third position P3, and the fourth speaker SPK4 may pronounce voice at a fourth position P4.

A voice processing device 100 may be an electronic device having an arithmetic processing function. For example, the voice processing device 100 may be a smartphone, a laptop, a personal digital assistance (PDA), a wearable device, a smart watch, or a tablet computer, but embodiments of the present disclosure are not limited thereto.

The voice processing device 100 may perform voice processing on the voices of the respective speakers SPK1 to SPK4 by processing voice signals associated with the voices of the speakers SPK1 to SPK4.

The voice processing device 100 may generate a voice signal associated with the voices of the speakers SPK1 to SPK4 in response to the voices of the respective speakers SPK1 to SPK4. The voice signals are signals associated with voices pronounced during a specific period of time, and may be signals representing voices of a plurality of speakers.

According to embodiments, the voice processing device 100 determines the sound source positions of the voices of the respective speakers SPK1 to SPK4 using the voice signals associated with the voices of the speakers SPK1 to SPK4, and performs the sound source isolation based on the sound source positions, thereby extracting (or generating) the isolated voice signals associated with the voices of the respective speakers SPK1 to SPK4 from the voice signals.

That is, the voice processing device 100 may generate the isolated voice signals associated with the voices of the speakers SPK1 to SPK4 positioned at each position P1 to P4 based on the sound source positions of the voices corresponding to the voice signals. For example, the voice processing device 100 may generate a first isolated voice signal associated with the voice of the first speaker SPK1 pronounced at the first position P1 based on the voice signal. In this case, the first isolated voice signal may be a voice signal having the highest correlation with the voice of the first speaker SPK1 among the voices of the speakers SPK1 to SPK4. In other words, among the voice components included in the first isolated voice signal, the voice component of the first speaker SPK1 may have the highest proportion.

In addition, the voice processing device 100 may provide translation for the voices of the respective speakers SPK1 to SPK4. For example, the voice processing device 100 may determine a source language (translation target language) and a target language (translated language) for translating the voices of the respective speakers SPK1 to SPK4, and generate the translation for the languages of the respective speakers using the isolated voice signals.

According to embodiments, the voice processing device 100 may output a translation result for the respective voices. The translation result may be text data or voice signals associated with the voices of the respective speakers SPK1 to SPK4 expressed by the target language.

That is, since the voice processing device 100 according to the embodiments of the present disclosure determines the source language and the target language according to the sound source positions of the voices of the respective speakers SPK1 to SPK4, it is possible to provide the translation for the voice of the speaker with less time and less resources without the need to identify the language of the voice of the speaker.

FIG. 2 illustrates the voice processing device according to the embodiments of the present disclosure. Referring to FIG. 2, the voice processing device 100 may include a microphone 110, a communication circuit 120, a processor 130, and a memory 140. According to embodiments, the voice processing device 100 may further include a speaker 150.

The microphone 110 may generate a voice signal in response to the generated voice. According to embodiments, the microphone 110 may detect vibration of air caused by voice and generate a voice signal which is an electrical signal corresponding to the vibration, according to the detection result.

According to embodiments, the microphone 110 may be provided in plurality, and each of the plurality of microphones 110 may generate a voice signal in response to voice. In this case, since positions where each of the plurality of microphones 110 are disposed may be different from each other, the voice signals generated from each of the microphones 110 may have a phase difference (or time delay) from each other.

For example, the microphone 110 may receive the voices of the speakers SPK1 to SPK4 positioned at each position P1 to P4, and convert the voices of the speakers SPK1 to SPK4 into voice signals that are electrical signals. The communication circuit 120 may exchange data with an external device according to a wireless communication method. According to embodiments, the communication circuit 120 may exchange data with an external device using radio waves of various frequencies. For example, the communication circuit 120 may exchange data with an external device according to at least one wireless communication method among short-range wireless communication, mid-range wireless communication, and long-range wireless communication.

The processor 130 may control the overall operation of the voice processing device 100. According to embodiments, the processor 130 may include a processor having an arithmetic processing function. For example, the processor 130 may include a central processing unit (CPU), a micro controller unit (MCU), a graphics processing unit (GPU), a digital signal processor (DSP), an analog to digital converter (ADC), or a digital to analog converter (DAC), but is not limited thereto.

The processor 130 may process voice signals generated by the microphone 110. For example, the processor 130 may convert an analog type voice signal generated by the microphone 110 into a digital type voice signal and process the converted digital type voice signal. In this case, since the signal type (analog or digital) is changed, in the description of the embodiments of the present disclosure, the digital type voice signal and the analog type voice signal will be used interchangeably.

According to embodiments, the processor 130 may extract (or generate) the isolated voice signals associated with the voices of the respective speakers SPK1 to SPK4 using the voice signal generated by the microphone 110. According to embodiments, the processor 130 may generate the isolated voice signals associated with the voices of the speakers SPK1 to SPK4 positioned at each position P1 to P4.

The processor 130 may determine the sound source positions of the voices (i.e., positions of speakers SPK1 to SPK4) using the time delay (or phase delay) between the voice signals. For example, the processor 130 may determine a relative position of the sound sources (i.e., speakers SPK1 to SPK4) for the voice processing device 100.

The processor 130 may generate the isolated voice signals associated with the voices of the respective speakers SPK1 to SPK4 based on the determined sound source position. For example, the processor 130 may generate a first isolated voice signal associated with the voice of the first speaker SPK1 based on the sound source positions of the voices.

According to embodiments, the processor 130 may match and store the sound source position information indicating the determined sound source position and the isolated voice signal. For example, the processor 130 may match the first isolated voice signal associated with the voice of the first speaker SPK1 and first sound source position information indicating the sound source position of the voice of the first speaker SPK1 and store the matched first isolated voice signal and first sound source position information in the memory 140. That is, since the position of the sound source corresponds to the positions of the respective speakers SPK1 to SPK4, the sound source position information may function as the speaker position information for identifying the positions of the respective speakers SPK1 to SPK4.

The operations of the processor 130 or the voice processing device 100 described herein may be implemented in the form of a program executable by a computing device. For example, the processor 130 may execute an application stored in the memory 140 and perform operations corresponding to instructions instructing specific operations according to the execution of the application.

The memory 140 may store data required for the operation of the voice processing device 100. For example, the memory 140 may include at least one of non-volatile memory and volatile memory.

According to embodiments, the memory 140 may store identifiers corresponding to each position P1 to P4 in space. The identifiers may be data for distinguishing the positions P1 to P4. Since each of the positions P1 to P4 is positioned in the respective speakers SPK1 to SPK4, the respective speakers SPK1 to SPK4 may be distinguished using the identifiers corresponding to the position P1 to P4. For example, the first identifier indicating the first position P1 may indicate the first speaker SPK1. From this point of view, the identifiers corresponding to each position P1 to P4 in space may function as speaker identifiers for identifying the respective speakers SPK1 to SPK4.

The identifier may be input through an input device (e.g., a touch pad) of the voice processing device 100.

According to embodiments, the memory 140 may store the sound source position information associated with the positions of the respective speakers SPK1 to SPK4 and the isolated voice signals associated with the voices of the respective speakers SPK1 to SPK4.

The speaker 150 may vibrate under the control of the processor 130, and the voice may be generated according to the vibration. According to embodiments, the speaker 150 may reproduce the voice associated with the voice signal by forming the vibration corresponding to the voice signal.

Meanwhile, the present specification describes that the voice processing device 100 includes the microphone 110 and uses the microphone 110 to directly generate the voice signals associated with the voices of the speakers SPK1 to SPK4. However, according to the embodiments, the microphone may be configured externally while being separated from the voice processing device 100, and the voice processing device 100 may receive a voice signal from the separately configured microphone and process or use the received voice signal. For example, the voice processing device 100 may generate the isolated voice signal from the voice signal received from the separated microphone.

However, for convenience of description, unless otherwise noted, it is assumed that the voice processing device 100 includes the microphone 110.

FIGS. 3 to 5 are diagrams for describing the operation of the voice processing device according to the embodiments of the present disclosure. Referring to FIGS. 3 to 5, each of the speakers SPK1 to SPK4 positioned at each position P1 to P4 may be pronounced.

The voice processing device 100 according to the embodiments of the present disclosure may generate the isolated voice signals associated with the voices of the respective speakers SPK1 to SPK4 from the voices of the speakers SPK1 to SPK4, and store the isolated voice signals and the position information indicating the positions of the respective speakers SPK1 to SPK4.

According to embodiments, the voice processing device 100 may determine the sound source positions (i.e., positions of speakers SPK1 to SPK4) of the voices using the time delay (or phase delay) between the voice signals. For example, the voice processing device 100 may determine the relative position of the sound sources (i.e., speakers SPK1 to SPK4) for the voice processing device 100.

The voice processing device 100 may generate the isolated voice signals associated with the voices of the respective speakers SPK1 to SPK4 based on the determined sound source position.

As illustrated in FIG. 3, the first speaker SPK1 pronounces voice "AAA." When the voice "AAA" is pronounced, the voice processing device 100 may generate a voice signal associated with the voice "AAA" in response to the voice "AAA." According to embodiments, the voice signal associated with the voice "AAA" may also include components associated with noises other than the voice "AAA".

According to embodiments, the voice processing device 100 may generate an isolated voice signal associated with the voice "AAA" of the first speaker SPK1 using the generated voice signal. In this case, the voice processing device 100 may store, in the memory 140, the first isolated voice signal associated with the voice "AAA" of the first speaker SPK1 and the first sound source position information indicating a first position P1 which is the position of the first speaker SPK1. For example, as illustrated in FIG. 3, the first isolated voice signal and the first sound source position information may be matched with each other and stored.

As illustrated in FIG. 4, the second speaker SPK2 pronounces voice "BBB." When the voice "BBB" is pronounced, the voice processing device 100 may generate a voice signal associated with the voice "BBB" in response to the voice "BBB."

According to embodiments, the voice processing device 100 may generate a second isolated voice signal associated with the voice "BBB" of the second speaker SPK2 using the generated voice signal. In this case, the voice processing device 100 may store, in the memory 140, the second isolated voice signal associated with the voice "BBB" of the second speaker SPK2 and second sound source position information indicating a second position P2 which is the position of the second speaker SPK2. For example, as illustrated in FIG. 4, the second isolated voice signal and the second sound source position information may be matched with each other and stored.

As illustrated in FIG. 5, the third speaker SPK3 pronounces voice "CCC" and the fourth speaker SPK4 pronounces voice "DDD." The voice processing device 100 may generate voice signals associated with the voice "CCC" and the voice "DDD" in response to the voice "CCC" and the voice "DDD." That is, the voice signal is a voice signal including components associated with the voice "CCC" and the voice "DDD".

According to embodiments, the voice processing device 100 may use the generated voice signal to generate a third isolated voice signal associated with the voice "CCC" of the third speaker SPK3 and a fourth isolated voice signal associated with the voice "DDD" of the fourth speaker SPK4.

In this case, the voice processing device 100 may store, in the memory 140, the third isolated voice signal associated with the voice "CCC" of the third speaker SPK3 and third sound source position information indicating a third position P3 which is the position of the third speaker SPK3. In addition, the voice processing device 100 may store, in the memory 140, the fourth isolated voice signal associated with the voice "DDD" of the fourth speaker SPK4 and fourth sound source position information indicating a fourth position P4 which is the position of the fourth speaker SPK4.

For example, as illustrated in FIG. 4, the third isolated voice signal and the third sound source position information may be matched with each other and stored, and the fourth isolated voice signal and the fourth sound source position information may be matched with each other and stored.

That is, the voice processing device 100 according to the embodiments of the present disclosure may generate the isolated voice signals associated with the voices of the respective speakers SPK1 to SPK4 from the voices of the speakers SPK1 to SPK4, and store the isolated voice signals and the position information indicating the positions of the respective speakers SPK1 to SPK4.

FIG. 6 is a flowchart illustrating a voice isolation method by a voice processing device according to embodiments of the present disclosure. A method of operating a voice processing device to be described with reference to FIG. 6 may be stored in a non-transitory storage medium and implemented as an application (e.g., a voice isolation application) executable by a computing device. For example, the processor 130 may execute an application stored in the memory 140 and perform operations corresponding to instructions instructing specific operations according to the execution of the application.

Referring to FIG. 6, the voice processing device 100 may generate a voice signal in response to voice (S110). According to embodiments, the voice processing device 100 may convert voice detected in space into a voice signal which is an electrical signal.

The voice processing device 100 may determine sound source positions (i.e., positions of the speakers SPK1 to SPK4) for the respective voices using the voice signals associated with the voices of the speakers SPK1 to SPK4 (S120). According to embodiments, the voice processing device 100 may generate the sound source position information indicating the sound source positions (i.e., positions of the speakers SPK1 to SPK4) for the voices of the respective speakers SPK1 to SPK4.

The voice processing device 100 may generate the isolated voice signals associated with the voices of the respective speakers SPK1 to SPK4 based on the sound source position for the respective voices (S130). According to embodiments, the voice processing device 100 may generate the isolated voice signals associated with the voices of the respective speakers SPK1 to SPK4 by isolating the generated voice signals based on the sound source positions for the respective voices. For example, the voice processing device 100 may generate the isolated voice signals associated with the voices of the respective speakers SPK1 to SPK4 by separating components included in the voice signal based on the sound source position.

The voice processing device 100 may store and an isolated voice signal and sound source position information indicating a position of a sound source (S140). According to embodiments, the voice processing device 100 may match and store the sound source position information indicating the position of the sound source and the isolated voice signals associated with the voices of the respective speakers SPK1 to SPK4. For example, the voice processing device 100 may match and store data corresponding to the isolated voice signals associated with the voices of the respective speakers SPK1 to SPK4 and the sound source position information.

According to embodiments, the voice processing device 100 (or processor 130) according to the embodiments of the present disclosure may execute an application (e.g., voice isolation application) stored in the memory 140, thereby generating (or separating) the isolated voice signals associated with the voices of the respective speakers SPK1 to SPK4 from the voice signals associated with the voices of the respective speakers SPK1 to SPK4.

In general, in order to process the voice signals, hardware such as a microphone and a processor configured to process the voice signals is required. Meanwhile, since a mobile terminal such as a smartphone basically includes a speaker and a processor, users may use the voice processing device 100 to perform the method according to the embodiments of the present disclosure, so speakers may isolate voices without separate hardware. For example, the processor 130 of the voice processing device 100 may execute the voice isolation application and perform voice separation using hardware (e.g., a speaker) included in the voice processing device 100.

FIG. 7 is a diagram for describing a translation function of a voice processing device according to embodiments of the present disclosure. Referring to FIG. 7, the first speaker SPK1 pronounces the voice "AAA" in Korean (KR), the second speaker SPK2 pronounces the voice "BBB" in English (EN), the third speaker SPK3 pronounces the voice "CCC" in Chinese (CN), and the fourth speaker SPK4 pronounces the voice "DDD" in Japanese (JP).

The voice processing device 100 according to the embodiments of the present disclosure may generate the isolated voice signals associated with the voices of the respective speakers SPK1 to SPK4 from the voices of the speakers SPK1 to SPK4, and provide the translation for the voices of the respective speakers SPK1 to SPK4 using the isolated voice signals. In this case, the voice processing device 100 may determine the source language of the voices of the speakers SPK1 to SPK4 using the source language information corresponding to the positions of the respective speakers SPK1 to SPK4, and provide the translation for the voices.

As illustrated in FIG. 7, the voice processing device 100 may store the isolated voice signals associated with the voices of the respective speakers SPK1 to SPK4, the sound source position information indicating the positions of the speakers SPK1 to SPK4, and the source language information indicating the source language of the voices of the speakers SPK1 to SPK4. In this case, the source language may be previously determined and stored for each sound source position.

For example, the voice processing device 100 may store first source language information indicating that the source language corresponding to the first position P1 is "KR" in the memory 140. In addition, the voice processing device 100 may store the first isolated voice signal associated with the voice "AAA" of the first speaker SPK1, the first sound source position information indicating the first position P1 which is the position of the first speaker SPK1, and the first source language information indicating "KR" which is the source language of the voice "AAA (KR)" of the first speaker SPK1 in the memory 140.

According to embodiments, when the speakers SPK1 to SPK4 pronounce the voice, the voice processing device 100 may generate the isolated voice signals associated with the voices of the respective speakers SPK1 to SPK4 and the sound source position information indicating the positions of the speakers SPK1 to SPK4 in response to the voices of the speakers SPK1 to SPK4.

The voice processing device 100 may determine the source language corresponding to each isolated voice signal using source language information, and provide the translation for the voices of the speakers SPK1 to SPK4 based on the determined source language. According to embodiments, the voice processing device 100 may determine the source language corresponding to the sound source positions of the respective voices using the sound source position information corresponding to each isolated voice signal, and generate the translation result of the isolated voice signals based on the determined source language.

For example, the voice processing device 100 may convert an isolated voice signal into text data (e.g., speech-to-text (STT) conversion), generate a translation result from a source language to a target language for the converted text data, and convert the translation result into a voice signal (e.g., text-to-speech (TTS) conversion). That is, the translation result referred to in this specification may mean all the text data or voice signals associated with the voices of each of the speakers SPK1 to SPK4 expressed in the target language.

According to embodiments, the voice processing device 100 may output the generated a translation result. For example, the voice processing device 100 may output the generated a translation result through the speaker 150 or transmit the generated a translation result to another external device.

FIG. 8 is a diagram for describing a translation function of a voice processing device according to embodiments of the present disclosure. Referring to FIG. 8, the voice processing device 100 may generate the isolated voice signals associated with the voices of the respective speakers SPK1 to SPK 4, and use the isolated voice signals to output the translation result for the voices of the respective speakers SPK1 to SPK 4. In this case, the translation result indicates a result of the languages of the voices of the speakers SPK1 to SPK4 being converted from the source language to another language (e.g., target language).

As illustrated in FIG. 8, the first speaker SPK1 pronounces the voice "AAA" in Korean (KR), and the second speaker SPK2 pronounces the voice "BBB" in English (EN). In this case, the source language of the voice "AAA" of the first speaker SPK1 is Korean (KR), and the source language of the voice "BBB" of the second speaker SPK2 is English (EN).

The voice processing device 100 may determine the sound source position (e.g., P1) of the first speaker SPK1 in response to the voice "AAA (KR)" of the first speaker SPK1, and generate the first isolated voice signal associated with the voice "AAA (KR)" of the first speaker SPK1 based on the sound source position. Similarly, the voice processing device 100 may determine the sound source position (e.g., P2) of the second speaker SPK2 in response to the voice "BBB (EN)" of the second speaker SPK2, and generate the second isolated voice signal associated with the voice "BBB (KR)" of the second speaker SPK2 based on the sound source position.

The voice processing device 100 may provide translation from the source language for the languages of the voices of speakers SPK1 to SPK4 to the target language using the generated isolated voice signal. According to embodiments, the voice processing device 100 may determine the source language determined according to the sound source positions of the voices of speakers SPK1 to SPK4 using the source language information stored in the memory 140, and output the translation result from the source language for the languages of the respective speakers SPK1 to SPK 4 to the target language according to the determined source language.

According to embodiments, the voice processing device 100 may store target language information indicating the target language for each position, and determine the target language correspond to the sound source positions of the voices of the respective speakers SPK1 to SPK 4 using the stored target language information. In addition, according to embodiments, the voice processing device 100 may determine the target language for the voices of the respective speakers SPK1 to SPK 4 based on the user input.

For example, the voice processing device 100 uses the first sound source position information indicating the first position P1, which is the sound source position of the voice "AAA (KR)" of the first speaker SPK1, to read the first source language information corresponding to the first position P1 from the memory 140. The read first source language information may indicate that the source language of the voice "AAA" of the first speaker SPK1 is Korean (KR).

The translation result may be output through the speaker 150, stored in the memory 140, or transmitted to an external device through the communication circuit 120.

In this specification, the translation result output by the voice processing device 100 may be text data expressed in the target language or a voice signal associated with the voice pronounced in the target language, but is not limited thereto.

In this specification, generating the translation result by the voice processing device 100 means that the voice processing device 100 includes not only generating a translation result by translating a language through the operation of the processor 130 itself of the voice processing device 100, but also generating the translation result by receiving a translation result from the server through communication with the server having a translation function.

For example, the processor 130 may execute a translation application stored in the memory 140 to generate the translation result for the voices of the respective speakers SPK1 to SPK.

For example, the voice processing device 100 may transmit the isolated voice signal, the source language information, and the target language information to a translator and receive the translation result for the isolated voice signal from the translator. The translator may refer to an environment or system that provides language translation. According to embodiments, the translator may output the translation result for the voices of the respective speakers SPK1 to SPK 4 using the isolated voice signal, the source language information, and the target language information.

For example, as illustrated in FIG. 8, the voice processing device 100 may determine the source language (i.e., Korean (KR)) and the target language (i.e., English (EN)) for the voice "AAA (KR)" of the first speaker SPK1, and output the translation result for the voice "AAA (KR)" of the first speaker SPK1 according to the determined source language and target language. For example, the translation result for the voice "AAA (KR)" may be data (e.g., voice data, text data, or the like) associated with the voice "AAA (EN)" expressed in English (EN). Meanwhile, although it is described in FIG. 8 that the target language for the voice "AAA (KR)" is English (EN), embodiments of the present disclosure are not limited thereto.

As described above, since the voice processing device 100 may provide the translation based on the isolated voice signals associated with the voices of the speakers SPK1 to SPK4, the voice processing device 100 may output a translation result for voice of a specific speaker.

Similarly, the voice processing device 100 may determine the source language (i.e., English (EN)) and the target language (i.e., Korean (KR)) for the voice "BBB (EN)" of the second speaker SPK2, and output the translation result for the voice "BBB (EN)" of the second speaker SPK2 according to the determined source language and target language. In addition, the voice processing device 100 may also output a translation result for the voice "CCC (CN)" of the third speaker SPK3 and the voice "DDD (CN)" of the fourth speaker SPK4.

FIG. 9 is a flowchart illustrating a method of providing a translation result by the voice processing device according to the embodiments of the present disclosure. A method of operating a voice processing device to be described with reference to FIG. 9 may be stored in a non-transitory storage medium and implemented as an application (e.g., a translation application) executable by a computing device. For example, the processor 130 may execute an application stored in the memory 140 and perform operations corresponding to instructions instructing specific operations according to the execution of the application.

Referring to FIG. 9, the voice processing device 100 may generate the isolated voice signals associated with the voices of the respective speakers SPK1 to SPK 4 (S210). According to embodiments, the voice processing device 100 may generate the isolated voice signals by isolating the voice signal generated in response to the voice based on the respective sound source positions of the respective voices.

The voice processing device 100 may determine the source language for translating the voices of the respective speakers SPK1 to SPK 4 (S220). According to embodiments, the voice processing device 100 may determine the source language for translating the voices of the respective speakers SPK1 to SPK 4 based on the sound source positions of the voices of the respective speakers SPK1 to SPK 4. In addition, the voice processing device 100 may determine the target language to which the voices of the respective speakers SPK1 to SPK 4 are to be translated based on the sound source positions of the voices of the respective speakers SPK1 to SPK 4.

The voice processing device 100 may output the translation result for the voices of the respective speakers SPK1 to SPK 4 according to the source language using the isolated voice signals (S230). According to embodiments, the voice processing device 100 may output a translation result from the source language to the target language for the voices of the respective speakers SPK1 to SPK 4 based on the determined source language (and target language).

The voice processing device 100 according to the embodiments of the present disclosure may generate the voice signals associated with the voices of the speakers SPK1 to SPK 4, and processes the voice signals to generate the isolated voice signals associated with the voices of the respective speakers SPK1 to SPK 4.

In addition, the voice processing device 100 according to the embodiments of the present disclosure may translate the voices of the speakers SPK1 to SPK 4 using the isolated voice signal and output the translation result. Accordingly, even if the languages used by speakers SPK1 to SPK4 are different, the respective speakers SPK1 to SPK4 may pronounce in their own languages, and the voices of the speakers using other languages may be translated and heard in their own language.

In general, in order to process the voice signals, hardware such as a microphone and a processor configured to process the voice signals is required. Meanwhile, since a mobile terminal such as a smartphone basically includes a speaker and a processor, when the voice processing device 100 is implemented in a mobile terminal such as a smartphone, by performing the method according to the embodiments of the present disclosure using the voice processing device 100, users may separate the voices of the speakers without having separate hardware and provide the translation for the voices using them.

FIGS. 10 and 11 are diagrams for describing an operation of a voice processing device according to embodiments of the present disclosure. Referring to FIGS. 10 and 11, the voice processing device 100 may operate in a position register mode (or speaker register mode). The position register mode means a mode for storing the sound source positions of the voices of the speakers SPK1 to SPK4 in the voice processing device 100 as the reference sound source position. Thereafter, the voice processing device 100 may generate the isolated voice signal by identifying the speakers SPK1 to SPK4 using the stored reference sound source position, or selectively process only the isolated voice signal associated with a voice pronounced at a specific position.

The processor 130 may operate in the position register mode in response to an input from the outside. According to embodiments, the processor 130 may operate in the position register mode in response to a voice signal including a specific phrase, or operate in the position register mode in response to an input through an input unit (e.g., a button or a touch panel) formed in the voice processing device 100.

The voice processing device 100 may determine sound source positions for the voices of the respective speakers SPK1 to SPK 4 in response to the voices of the speakers SPK1 to SPK 4 and generate sound source position information indicating the sound source position.

In the position register mode, the voice processing device 100 may store the generated sound source position information in the memory 140 as the reference sound source position information.

For example, as illustrated in FIG. 10, in the position register mode, when the first speaker SPK1 pronounces "I am Alice", the voice processing device 100 may generate the voice signal in response to the voice of the first speaker SPK1, and determine the first position P1, which is the position of the first speaker SPK1, from the voice signal. The voice processing device 100 may generate first position information indicating the first position P1 and store the first sound source position information as the reference sound source position information.

Similarly, for example, as illustrated in FIG. 11, the voice processing device 100 may determine the sound source positions P2 to P2 of the remaining speakers SPK2 to SPK4 in response to the voices of the remaining speakers SPK2 to SPK3. Meanwhile, the voice processing device 100 according to the embodiments of the present disclosure may calculate the sound source positions of the voices of the respective speakers SPK1 to SPK 4 even if the voices of the speakers SPK1 to SPK 4 are temporally overlapped and pronounced.

The voice processing device 100 may generate the second sound source position information indicating the second position P2 which is the position of the second speaker SPK2, store the second sound source position information as the reference sound source position information, generate the third sound source position information indicating the third position P3 which is the position of the third speaker SPK3, store the third sound source position information as the reference sound source position information, generate the fourth sound source position information indicating the fourth position P4 which is the position of the fourth speaker SPK4, and store the fourth sound source position information as the reference sound source position information.

According to embodiments, the voice processing device 100 may store the sound source position information and the identifier corresponding to the sound source position information. The identifier is data for distinguishing a sound source position, and may be, for example, data (e.g., name, etc.) indicating the speaker positioned at the corresponding sound source position.

For example, as illustrated in FIG. 10, the voice processing device 100 may generate a first identifier SID1 indicating the first speaker SPK1 in response to the voice of the first speaker SPK1, and match and store the generated first identifier SID1 and the first sound source position information. That is, the first identifier SID1 may be a means for identifying the first speaker SPK1. For example, the voice processing device 100 may convert at least a portion of the voice of the first speaker SPK1 into text and generate the first identifier SID1 corresponding to the converted text. For example, the voice processing device 100 may convert at least a portion of phrases included in the voice of the first speaker SPK1 into the first identifier SID1.

For example, as illustrated in FIG. 11, the voice processing device 100 may generate the identifiers SID2 to SID4 indicating the remaining speakers SPK2 to SPK4 in response to the voices of the remaining speakers SPK2 to SPK4, and match and store the generated identifiers SID2 to SID4 and the sound source position information of the speakers SPK2 to SPK4.

FIG. 12 is a diagram illustrating the operation of the voice processing device according to the embodiments of the present disclosure. Referring to FIG. 12, the voice processing device 100 may operate in a voice separation mode.

According to embodiments, the processor 130 may operate in the voice separation mode in response to an input from the outside. According to embodiments, the processor 130 may operate in the voice register mode in response to a voice signal including a specific phrase, or operate in the voice separation mode in response to the input through the input unit (e.g., a button or a touch panel) formed in the voice processing device 100.

In the voice separation mode, the voice processing device 100 may isolate the voice signals associated with the voices of the speakers SPK1 to SPK 4 based on the sound source position of the voices, thereby generating the isolated voice signals associated with the voices of the speakers SPK1 to SPK 4 and storing the generated isolated voice signals.

According to embodiments, the voice processing device 100 may store a pre-stored (or registered) reference sound source position and an isolated voice signal associated with a voice corresponding to the corresponding sound source position. For example, the voice processing device 100 may store an isolated voice signal associated with a voice corresponding to a sound source position within a reference range from the reference sound source position, among the isolated voice signals from the voice signal.

According to embodiments, in voice separation mode, the processor 130 may operate in the position register mode when the sound source position of the recognized voice does not correspond to the pre-stored (or registered) reference sound source position. For example, when the sound source position of the recognized voice is different from the pre-stored reference sound source position, the processor 130 may operate in the position register mode, thereby registering a new sound source position.

The voice processing device 100 may match and store the isolated voice signals associated with the voices of the respective speakers SPK1 to SPK 4 and the corresponding identifiers. For example, as illustrated in FIG. 12, the voice processing device 100 may match and store the first isolated voice signal and the first identifier SID1 according to the first sound source position information indicating the first position P1 which is the position of the first speaker SPK1. For example, the voice processing device 100 may refer to the reference sound source position information stored in the memory 140 to match and store the first identifier SID1 corresponding to the first sound source position information and the first isolated voice signal.

In addition, the voice processing device 100 may additionally match and store an isolated voice signal and a time when a voice corresponding to the isolated voice signal was received.

FIG. 13 illustrates the voice processing device according to the embodiments of the present disclosure. Referring to FIG. 13, a voice processing device 100A may include a microphone 110, a communication circuit 120, a processor 130, a memory 140, and a trigger signal generation circuit 151.

Compared to FIG. 2, there is a difference in that the voice processing device 100A of FIG. 13 additionally includes the trigger signal generation circuit 151. Hereinafter, for convenience of description, descriptions of overlapping parts will be omitted, and the differences will be described.

The trigger signal generation circuit 151 may generate trigger signals in response to input from the outside. The trigger signals may be signals that cause the processor 130 to perform a specific operation. The trigger signals may include a speaker register trigger signal and a speaker moving trigger signal. In this case, input conditions for generating the speaker register trigger signal and the speaker moving trigger signal may be different.

According to embodiments, the trigger signal generation circuit 151 may include an input unit capable of detecting physical input such as a touch panel or a button from the outside, and may generate trigger signals in response to the physical input. For example, the trigger signal generation circuit 151 may generate trigger signals when a user's touch is detected.

According to embodiments, the trigger signal generation circuit 151 may generate trigger signals by recognizing trigger words included in voice signals received by the voice processing device 100A. For example, the trigger signal generation circuit 151 may generate trigger signals when a voice signal including a specific phrase such as "speaker registration" is received.

The trigger signal generation circuit 151 may transmit the generated trigger signals to the processor 130.

According to embodiments, the processor 130 may enter a speaker register mode (or position register mode) in response to a speaker identification trigger signal. According to embodiments, the speaker register mode may be defined as a predetermined interval from the time when the speaker register trigger signal is received or may be defined as an interval while the speaker register trigger signal is received, but is not limited thereto.

As described with reference to FIGS. 10 and 11, the voice processing device may generate reference sound source position information and an identifier using received voice signals in the speaker register mode, and may also generate an isolated voice signal, and match and store reference sound source position information, the identifier, and the isolated voice signal.

FIGS. 14 and 15 are diagrams for describing a speaker moving mode according to the embodiments of the present disclosure. The speaker moving mode described with reference to FIGS. 14 and 15 may be performed by the voice processing device 100A of FIG. 13.

Referring to FIGS. 14 and 15, a position of Alice before moving is "P1", and after the speaker register mode, the memory 140 of the voice processing device 100A may store an identifier SID for identifying Alice, and Alice's position "P1" may be stored as a reference sound source position.

After movement, Alice pronounces the voice "I am Alice" at position P5. In the speaker moving mode, the voice processing device 100A may newly generate sound source position information indicating the Alice's position "P5" after movement using voice signals associated with Alice's voice.

The voice processing device 100A may refer to the memory 140 to update reference sound source position information that matches the speaker identifier SID and is stored. For example, the voice processing device 100A may update the reference sound source position information "P1", which is previously matched with the speaker identifier SID "Alice" and stored, to "P5" which is the reference sound source position information for the position after moving.

Accordingly, the voice processing device 100A according to the embodiments of the present disclosure has an effect of updating the speaker position information, which matches the speaker identifier and is stored, to the changed speaker position informaiton, even if the position of the speaker is changed due to the movement of the speaker.

FIG. 16 illustrates the voice processing device according to the embodiments of the present disclosure. Referring to FIG. 16, a voice processing device 100B may include a microphone 110, a communication circuit 120, a processor 130, a memory 140, and a motion sensor 153.

Compared to FIG. 2, there is a difference in that the voice processing device 100B of FIG. 16 additionally includes the motion sensor 153. Hereinafter, for convenience of description, descriptions of overlapping parts will be omitted, and the differences will be described.

The motion sensor 153 may measure a physical quantity related to the voice processing device 100B and generate a detection signal corresponding to the measured physical quantity. For example, the motion sensor 153 may measure the position or movement of the voice processing device 100B, and generate and output a detection signal corresponding to the measured position or movement.

According to embodiments, the motion sensor 153 may measure the position of the voice processing device 100B and output the detection signal indicating the position of the voice processing device 100B. For example, the motion sensor 153 may be a GPS sensor, a light detection and ranging (LIDAR) sensor, a radio detection and ranging sensor, or an ultra wide band (UWB) sensor, but the embodiments of the present disclosure are not limited thereto.

According to embodiments, the motion sensor 153 may measure the position of the voice processing device 100B and output the detection signal indicating the movement of the voice processing device 100B. For example, the motion sensor 153 may be a gyro sensor, a speed sensor, or an acceleration sensor, but the embodiments of the present disclosure are not limited thereto.

Meanwhile, in this specification, the motion sensor 153 is described as a configuration for measuring the position or movement of the voice processing device 100B, but according to embodiments, the position or movement of the voice processing device 100B may be measured by the processor 130 and the motion sensor 153. For example, the motion sensor 153 may generate and output a signal associated with the position or movement of the voice processing device 100B, and the processor 130 may generate the value associated with the position or movement of the voice processing device 100B based on the signal output from the motion sensor 153.

FIGS. 17 and 18 are diagrams for describing the operation of the voice processing device according to the embodiments of the present disclosure. The operation described with reference to FIGS. 17 and 18 may be performed by the voice processing device 100B described with reference to FIG. 16.

Referring to FIGS. 17 and 18, when the movement of the voice processing device 100B is detected, the voice processing device 100B may store the sound source position for the changed voices of the speakers SPK1 to SPK 4 as the reference source position information.

As illustrated in FIG. 17, when the position of the voice processing device 100B changes according to the movement of the voice processing device 100B, the relative position with respect to the processing devices 100B of the voices of the speakers SPK1 to SPK 4 may be different. Furthermore, even if the position of the voice processing device 100B does not change, when the movement (rotation, vibration, movement, etc.) of the voice processing device 100B occurs, the relative position with respect to the processing devices 100B of the voices of the speakers SPK1 to SPK 4 may be different. In other words, the sound source positions of the voices of the speakers SPK1 to SPK4 may be different.

For example, the position of the first speaker SPK1 may change from P1 to P5, the position of the second speaker SPK2 may change from P2 to P6, the position of the third speaker SPK3 may change from P3 to P7, and the position of the fourth speaker SPK4 may change from P4 to P8.

The voice processing device 100B according to the embodiments of the present disclosure includes the motion sensor 153 capable of detecting the movement of the voice processing device 100B, and may detect the change in the position of the voice processing device 100B through the detection result of the motion sensor 153. In addition, the voice processing device 100B has an effect of determining the changed sound source position by the movement of the voice processing device 100B and storing the changed sound source position as the reference sound source position information.

Referring to FIG. 18, the voice processing device 100B may operate in the position register mode when the movement of the voice processing device 100B is detected. According to embodiments, the processor 130 may detect the movement of the voice processing device 100B using the detection result of the motion sensor 153 and determine whether to operate in the position register mode.

That is, even after the voice processing device 100B has completed the registration of the sound source positions of the respective speakers SPK1 to SPK4 (i.e., the positions of the speakers SPK1 to SPK4) as the reference sound source position information according to the position register mode, when the movement of the voice processing device 100B is detected, the voice processing device 100B may operate in the position register mode again.

For example, as illustrated in FIG. 18, in the position register mode, when the first speaker SPK1 pronounces "I am Alice" at the changed position "P5", the voice processing device 100 may generate the voice signal in response to the voice of the first speaker SPK1, and determine the P5, which is the changed sound source position (i.e., changed position of the first speaker SPK1), from the voice signal. The voice processing device 100B may generate the sound source position information indicating the changed position "P5" and store the sound source position information as the reference sound source position information.

According to embodiments, the voice processing device 100B may store the sound source position information indicating the changed positions of the respective speakers SPK1 to SPK4 as new reference sound source position information, or replace the pre-stored sound source position information with the sound source position information indicating the changed position.

FIG. 19 is a flowchart illustrating a method of operating a voice processing device according to embodiments of the present disclosure. The method of operating a voice processing device to be described with reference to FIG. 19 may be stored in a non-transitory storage medium and implemented as an application executable by a computing device.

An operation method to be described with reference to FIG. 19 may be performed by the voice processing device 100B described with reference to FIG. 16.

The voice processing device 100 may determine the sound source positions for the voices of the respective speakers SPK1 to SPK 4 in response to the voices of the speakers SPK1 to SPK 4 and generate the sound source position information indicating the sound source positions (S310). According to embodiments, the voice processing device 100B may generate the voice signals for the voices of the respective speakers SPK1 to SPK 4 in response to the voices of the speakers SPK1 to SPK 4 and generate the sound source position information indicating the sound source positions for the voices of the respective speakers SPK1 to SPK4. In this case, the sound source position represents the positions of the respective speakers SPK1 to SPK4.

The voice processing device 100B may store the generated sound source position information as reference sound source position information (S320). According to embodiments, the voice processing device 100B may store the generated sound source position information in the memory 140 as the reference sound source position information.

The voice processing device 100B may detect the movement of the voice processing device 100B (S330). According to embodiments, the voice processing device 100B may detect the movement of the voice processing device 100B using the motion sensor 153. For example, the voice processing device 100B may detect a change in position, a change in angle, or a change in speed and acceleration of the voice processing device 100B using the motion sensor 153.

The voice processing device 100B may determine whether the detected movement exceeds the reference movement (S340). According to embodiments, the voice processing device 100B may determine whether a physical quantity detected using the motion sensor 153 exceeds a predetermined reference physical quantity. For example, the voice processing device 100B may determine whether a change in periodically measured position of the voice processing device 100B exceeds a reference value or determine whether the acceleration of the voice processing device 100B exceeds a reference value, thereby determining whether the movement exceeds the standard movement.

When the detected movement exceeds the reference movement (Y in S340), the voice processing device 100B may generate the sound source position information in response to the voices of the speakers SPK1 to SPK 4, and store the generated sound source position information as the reference sound source position information. That is, when the detected movement exceeds the reference movement, the voice processing device 100B may determine again the sound source positions of the voices of the speakers SPK1 to SPK 4 based on the sound source position information indicating the changed sound source position, and again store the sound source position information indicating the changed sound source position as the reference sound source position information. Through this, even if the relative positions of the speakers SPK1 to SPK4 changes due to the movement of the voice processing device 100B, the reference sound source position information may be updated. Accordingly, an error due to the change in the relative position of the speakers SPK1 to SPK4 due to the movement of the voice processing device 100B may be minimized.

FIG. 20 illustrates the voice processing device according to the embodiments of the present disclosure. Referring to FIG. 20, a voice processing device 100C may include a microphone 110, a communication circuit 120, a processor 130, a memory 140, and a light emitting device 155.

Compared to FIG. 2, there is a difference in that the voice processing device 100C of FIG. 20 additionally includes the light emitting device 155. Hereinafter, for convenience of description, descriptions of overlapping parts will be omitted, and the differences will be described.

The light emitting device 155 may emit light under the control of the processor 130. According to embodiments, the light emitting device 155 includes light emitting elements, and the light emitting elements may emit light of a specific wavelength according to an electrical signal. For example, the light emitting device 155 may be a light emitting diode, a liquid crystal display (LCD), an organic lighting emitting diode (OLED) light emitting device, a flexible light emitting device, a micro LED light emitting device, or a quantum dot light emitting device, but the embodiments of the present disclosure are not limited thereto.

According to embodiments, the light emitting device 155 may operate under the control of the processor 130. For example, the light emitting device 155 may display a specific visual pattern based on the control signal transmitted from the processor 130.

FIG. 21 illustrates the voice processing device according to the embodiments of the present disclosure. Referring to FIG. 21, the voice processing device 100C may include the light emitting device 155.

According to embodiments of the present disclosure, the light emitting device 155 may include a plurality of light emitting elements LED1 to LEDn (n is a natural number greater than or equal to 2). According to embodiments, the plurality of light emitting elements LED1 to LEDn may be disposed on the surface of the voice processing device 100C, but the embodiments of the present disclosure are not limited thereto, and the plurality of light emitting elements LED1 to LEDn may be arranged in a part visible with the naked eye among parts of the voice processing device 100.

For example, as illustrated in FIG. 21, the voice processing device 100C is implemented in a form having a circular cross section, and a plurality of light emitting elements LED1 to LEDn may be continuously arranged along the circumference of the surface of the voice processing device 100C, but is not limited thereto.

Each of the plurality of light emitting elements LED1 to LEDn may be arranged at different positions.

As will be described later, the voice processing device 100C may determine the positions of the speakers SPK1 to SPK4 in response to the voices of the speakers SPK1 to SPK 4, and display a visual pattern corresponding to a position of a pronouncing speaker through the light emitting device 155. For example, the voice processing device 100C may turn on a light emitting element corresponding to a position of a pronouncing speaker among the plurality of light emitting elements LED1 to LEDn. Accordingly, a user may identify the positions of the speakers SPK1 to SPK4 currently being pronounced through the positions of the light emitting elements that emit light among the light emitting elements LED1 to LEDn arranged in the light emitting device 100C.

For example, each of the light emitting elements LED1 to LEDn may indicate a specific position.

FIGS. 22 and 23 are diagrams for describing the operation of the voice processing device according to the embodiments of the present disclosure. Referring to FIGS. 22 and 23, the voice processing device 100C according to the embodiments of the present disclosure may determine the positions of the voices of the respective speakers SPK1 to SPK 4 in response to the voices of the speakers SPK1 to SPK 4, and output visual patterns corresponding to each position according to the determined positions.

Meanwhile, in an embodiment to be described with reference to FIGS. 22 and 23, it is assumed and described that the voice processing device 100C outputs visual patterns corresponding to the positions of the speakers SPK1 to SPK4 using a plurality of light emitting elements LED1 to LED8. However, according to embodiments, the voice processing device 100C may output the visual patterns corresponding to the positions of the speakers SPK1 to SPK4 according to another visual expression method.

The voice processing device 100C may determine the sound source positions (i.e., the positions of the speakers SPK1 to SPK4) of the voices from the voices of the speakers SPK1 to SPK 4 according to the embodiments described with reference to FIGS. 3 to 5.

The voice processing device 100C may store identifiers for distinguishing the light emitting elements LED1 to LED8 and information on positions corresponding to each of the light emitting elements LED1 to LED8. For example, as illustrated in FIGS. 22 and 23, the position corresponding to the second light emitting element LED2 is a second position P2. In this case, the positions corresponding to each of the light emitting elements LED1 to LED8 may be actual positions of each of the light emitting elements LED1 to LED8, or may be predetermined positions not associated with the actual positions.

According to embodiments of the present disclosure, the voice processing device 100C may determine the sound source position associated with the voices of the respective speakers SPK1 to SPK 4 in response to the voices of the speakers SPK1 to SPK 4, and may operate light emitting elements arranged at positions corresponding to the determined sound source positions among the light emitting elements LED1 to LED8.

For example, as illustrated in FIG. 22, when the first speaker SPK1 positioned at the first position P1 pronounces, the voice processing device 100C may determine the position (i.e., sound source position) of the first speaker SPK1 from the voice of the first speaker SPK1, and operate the light emitting element corresponding to the first position P1 which is the position of the first speaker SPK1. Since the light emitting element corresponding to the first position P1 is an eighth light emitting element LED8, the voice processing device 100C may turn on the eighth light emitting element LED8. For example, the processor 130 may output a control signal for turning on the eighth light emitting element LED8.

Similarly, for example, as illustrated in FIG. 23, when the second speaker SPK2 positioned at the second position P2 pronounces, the voice processing device 100C may turn on the second light emitting element LED2. For example, the processor 130 may output a control signal for turning on the second light emitting element LED2.

The voice processing device 100C may turn on the light emitting elements corresponding to the positions of the respective speakers SPK1 to SPK4 at a time when the voices of the respective speakers SPK1 to SPK 4 are recognized. According to embodiments, the voice processing device 100C may turn on the light emitting element while the voices of the respective speakers SPK1 to SPK 4 are recognized, and turn off the light emitting device when the voices of the respective speakers SPK1 to SPK 4 are not recognized.

The voice processing device 100C according to the embodiments of the present disclosure may turn on a light emitting element corresponding to a position of a pronouncing speaker among the plurality of light emitting elements LED1 to LEDn. Accordingly, a user may identify the positions of the speakers SPK1 to SPK4 currently being pronounced through the positions of the light emitting elements that emit light among the light emitting elements LED1 to LEDn arranged in the light emitting device 100C.

FIG. 24 is a flowchart illustrating a method of operating a voice processing device according to embodiments of the present disclosure. The method of operating a voice processing device to be described with reference to FIG. 24 may be stored in a non-transitory storage medium and implemented as an application executable by a computing device.

Referring to FIG. 24, the voice processing device 100C may generate a voice signal in response to voice (S410). According to embodiments, the voice processing device 100C may convert voice detected in space into a voice signal which is an electrical signal (S410).

The voice processing device 100 may determine sound source positions (i.e., positions of the speakers SPK1 to SPK4) for the respective voices using the voice signals associated with the voices of the speakers SPK1 to SPK4 (S420). According to embodiments, the voice processing device 100C may generate the sound source position information indicating the sound source positions (i.e., positions of the speakers SPK1 to SPK4) for the voices of the respective speakers SPK1 to SPK4.

The voice processing device 100C may display a visual pattern corresponding to the sound source position based on the sound source positions for the respective voices (S430).

According to embodiments, the voice processing device 100C includes the light emitting device 155 including the plurality of light emitting elements LED1 to LEDn, and may turn on the light emitting element corresponding to the sound source position of the voice among the plurality of light emitting elements LED1 to LEDn.

In addition, according to embodiments, the voice processing device 100C may include the light emitting device 155 implemented as a display device, and the light emitting device 155 may display the visual patterns indicating the sound source positions of the speakers SPK1 to SPK4. For example, the light emitting device 155 may display the visual patterns indicating the sound source positions of the speakers SPK1 to SPK4 by displaying figures such as an arrow, a straight line, or a finger.

FIG. 25 is a diagram for describing the operation of the voice processing device according to the embodiments of the present disclosure. Referring to FIG. 25, the voice processing device 100C may operate in the voice register mode.

As described with reference to FIGS. 10 and 11, in the position register mode, the voice processing device 100C may store the generated sound source position information in the memory 140 as the reference sound source position information.

In the position register mode, the voice processing device 100C may determine the sound source positions of the voices of the respective speakers SPK1 to SPK 4 in response to the voices of the speakers SPK1 to SPK 4, and output the visual patterns corresponding to the determined sound source positions. According to embodiments, when the sound source position information is stored in the memory 140 as the reference sound source position information, the voice processing device 100C may output the visual pattern corresponding to the stored sound source position information.

For example, as illustrated in FIG. 25, when the first sound source position information indicating the first position P1 is stored as the reference sound source position information, the voice processing device 100C may turn on the eighth light emitting element LED8 corresponding to the first position P1 among the plurality of light emitting elements LED1 to LED8. In addition, when the sound source position information indicating the positions P2 to P4 of the remaining speakers SPK2 to SPK4 is stored as the reference sound source position information, the voice processing device 100C may turn on the second light emitting element LED2 corresponding to the second position P2, the sixth light emitting element LED6 corresponding to the third position P3, and the fourth light emitting element LED4 corresponding to the fourth position P4 among the plurality of light emitting elements LED1 to LED8.

Accordingly, the speakers SPK1 to SPK4 have an effect of easily identifying where the registered sound source position is as the reference position.

FIG. 26 is a diagram illustrating the operation of the voice processing device according to the embodiments of the present disclosure. Referring to FIG. 26, the voice processing device 100C may operate in the voice separation mode.

As described with reference to FIG. 12, in the voice separation mode, the voice processing device 100 may isolate the voice signals associated with the voices of the speakers SPK1 to SPK 4 based on the sound source position of the voices, thereby generating the isolated voice signals associated with the voices of the speakers SPK1 to SPK 4 and storing the generated isolated voice signals.

In the voice separation mode, the voice processing device 100C may determine the sound source positions of the voices of the respective speakers SPK1 to SPK 4 in response to the voices of the speakers SPK1 to SPK 4, and output the visual patterns corresponding to the recognized sound source positions. For example, as illustrated in FIG. 26, the voice processing device 100C may turn on the light emitting elements (the eighth light emitting element LED8, the second light emitting element LED2, and the sixth light emitting element LED6) corresponding to the position of the pronouncing speaker among the plurality of light emitting elements LED1 to LED8.

Accordingly, the speakers SPK1 to SPK4 have the effect of easily identifying where the sound source position of the currently pronouncing voice is.

According to embodiments, in the voice separation mode, the voice processing device 100C may output a visual pattern corresponding to a sound source position according to a display method different from that in the position register mode. For example, the voice processing device 100C may output a visual pattern corresponding to a sound source position according to a first display method in the position register mode, and output a visual pattern corresponding to a sound source position according to a second display method different from the first display method in the voice separation mode. The display method may mean an output color, an output time, an output cycle, and the like of the visual pattern.

For example, in the position register mode, when the sound source position information is stored in the memory 140 as the reference sound source position information, the voice processing device 100C may output the visual pattern corresponding to the stored sound source position information, and in the voice separation mode, the voice processing device 100C may output the visual pattern corresponding to the sound source position information of the recognized voice while the voices of the speakers SPK1 to SPK 4 are recognized.

FIG. 27 is a diagram for describing the operation of the voice processing device according to the embodiments of the present disclosure. The operation method of FIG. 27 may be performed by the voice processing devices 100, 100A, 100B, and 100C.

The voice processing device 100 may generate meeting minutes (MIN) using the isolated voice signals associated with the voices of the respective speakers SPK1 to SPK 4. The generated meeting minutes (MIN) may be stored in the form of a document file, image file, or voice file, but is not limited thereto.

The voice processing device 100 may generate data indicating the voices of the respective speakers SPK1 to SPK 4 based on the isolated voice signals that are matched with each other and stored, and generate the meeting minutes using the data indicating the generated voices of the respective speakers SPK1 to SPK 4. According to embodiments, the voice processing device 100 may generate the meeting minutes (MIN) by arranging data associated with the voices of the respective speakers in chronological order according to the time when which the voices of the respective speakers SPK1 to SPK 4 are recognized.

According to embodiments, the voice processing device 100 may use the identifiers for identifying the speakers SPK1 to SPK4 to display identifiers indicating the speakers SPK1 to SPK4 that have pronounced a specific voice in the meeting minutes MIN. Through this, remarks in the meeting minutes (MIN) may be distinguished for each speaker.

As illustrated in FIG. 27, the speakers SPK1 to SPK4 sequentially pronounce "AAA1", "BBB2", "AAA3", "CCC4", "DDD5", "CCC6", and "BBB7". As described above, the voice processing device 100 may match and store the first isolated voice signals corresponding to "AAA1" and "AAA3" and the first identifier SID1 indicating the first speaker SPK1, match and store the second isolated voice signals corresponding to "BBB2" and "BBB7" and the second identifier SID2, match and store the third isolated voice signals corresponding to "CCC4" and "CCC6" and the third identifier SID3, and match and store the fourth isolated voice signal corresponding to "DDD5" and the fourth identifier SID4.

As described above, although the embodiments have been described by the limited embodiments and drawings, various modifications and alternations are possible by those of ordinary skill in the art from the above description. For example, even though the described techniques may be performed in a different order than the described method, and/or components of the described systems, structures, devices, circuits, etc., may be combined or combined in a different manner than the described method, or replaced or substituted by other components, appropriate results may be achieved.

Therefore, other implementations, other embodiments, and equivalents of the claims are within the scope of the following claims.

INDUSTRIAL APPLICABILITY

Embodiments of the present disclosure relate to a device for processing voice and an operating method thereof.

The invention claimed is:

1. A voice processing device, comprising:
a processor configured to sound source isolation on voice signals associated with voices of speakers based on sound source positions of the respective voices; and
a memory,
wherein the processor is configured to: generate sound source position information indicating the sound source positions of the respective voices using the voice signals associated with the voices;
generate isolated voice signals associated with the voices of the respective speakers from the voice signals based on the sound source position information; and
match the isolated voice signals and the sound source position information and store the matched isolated voice signals and sound source position information in the memory,
wherein the processor generates the sound source position information indicating the sound source positions of the respective voices using the voice signal and converts the sound source position information in the memory as reference sound source position information, in a position register mode, and
stores the isolated voice signal associated with the voice corresponding to the sound source position within a reference range from the reference sound source position in the voice separation mode.

2. The voice processing device of claim 1, further comprising: a microphone configured to generate the voice signal in response to the voices of the speakers.

3. The voice processing device of claim 2, wherein the microphone includes a plurality of microphones arranged to form an array, and
the plurality of microphones are configured to generate the voice signals in response to the voices.

4. The voice processing device of claim 3, wherein the processor determines the sound source positions of the respective voices based on a time delay between the plurality of voice signals generated from the plurality of microphones, and
generates the isolated voice signals based on the determined sound source positions.

5. The voice processing device of claim 1, wherein the memory stores source language information indicating source language which are pronounced languages of the voices of the speakers, and
the processor outputs a translation result in which the languages of the voices of the speakers are translated from the source language to target language, which are languages to be translated, based on the source language information and the isolated voice signal.

6. The voice processing device of claim 5, wherein the processor determines source language corresponding to the positions of the voices according to the sound source positions of the respective voices based on the source language information, and outputs a translation result for the respective voices according to the determined source language.

7. The voice processing device of claim 1, wherein the memory stores an identifier for identifying the respective speakers, and
the identifier matches the reference sound source position information and is stored.

8. The voice processing device of claim 7, wherein the processor compares the sound source position information corresponding to the isolated voice signal with the reference sound source position information, determines the identifier corresponding to the sound source position information corresponding to the isolated voice signal, and matches the isolated voice signal and the identifier and stores the matched isolated voice signal and identifier in the memory.

9. The voice processing device of claim 1, further comprising:
a trigger signal generation circuit configured to generate a speaker register trigger signal;
wherein the processor operates in the position register mode in response to the speaker register trigger signal.

10. The voice processing device of claim 9, wherein the trigger signal generation circuit generates a speaker moving trigger signal, and the processor generates speaker position information and a speaker identifier using the voice signals in response to the speaker moving trigger signal, determines a reference speaker identifier matching the speaker identifier, and updates the reference speaker position information, which matches the reference speaker identifier and is stored, to the generated speaker position information.

11. The voice processing device of claim 9, further comprising:
a motion sensor configured to detect the movement of the voice processing device,
wherein the processor determines whether the movement of the voice processing device detected by the sensor exceeds a reference movement, and
when the movement of the voice processing device exceeds the reference movement, generates the sound source position information indicating the changed sound source position of the voices of the speakers, and stores the sound source position information indicating the changed sound source position in the memory as the reference sound source position information.

12. The voice processing device of claim 1, further comprising:
a light emitting device configured to emit light under control of the processor,
wherein the processor outputs a light emitting control signal for controlling the light emitting device so that a visual pattern corresponding to the sound source position is displayed through the light emitting device.

13. The voice processing device of claim 12, wherein the light emitting device includes a plurality of light emitting elements, each of which is configured to emit light, and
the processor outputs a light emitting control signal for selectively turning on a light emitting element corresponding to the determined sound source position among the plurality of light emitting elements.

14. The voice processing device of claim 13, wherein the memory stores information indicating identifiers and positions of each of the light emitting elements, and
the processor reads the identifier of the light emitting element corresponding to the determined sound source position among the plurality of light emitting elements by referring to the memory, and outputs the light emitting control signal for selectively turning on the light emitting element corresponding to the determined sound source position using the read identifier.

* * * * *